US011061178B2

(12) United States Patent
Yamashita et al.

(10) Patent No.: US 11,061,178 B2
(45) Date of Patent: Jul. 13, 2021

(54) LIGHT EMITTING MODULE

(71) Applicant: NICHIA CORPORATION, Anan (JP)

(72) Inventors: Ryohei Yamashita, Tokushima (JP); Toshinobu Katsumata, Anan (JP); Seitaro Akagawa, Komatsushima (JP); Toshiaki Moriwaki, Itano-gun (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 16/810,420

(22) Filed: Mar. 5, 2020

(65) Prior Publication Data

US 2020/0284968 A1 Sep. 10, 2020

(30) Foreign Application Priority Data

Mar. 5, 2019 (JP) ............................ JP2019-039973
Apr. 26, 2019 (JP) ............................ JP2019-084913

(51) Int. Cl.
*F21V 8/00* (2006.01)

(52) U.S. Cl.
CPC ......... *G02B 6/0021* (2013.01); *G02B 6/0026* (2013.01); *G02B 6/0055* (2013.01); *G02B 6/0083* (2013.01)

(58) Field of Classification Search
CPC .... G02B 6/0021; G02B 6/0026; G02B 6/005; G02B 6/0083
See application file for complete search history.

(56) References Cited

U.S. PATENT DOCUMENTS

| | | | | |
|---|---|---|---|---|
| 8,070,345 B2 * | 12/2011 | Zhang | G02B 6/0043 362/619 |
| 9,329,322 B2 * | 5/2016 | Yamada | G02B 6/0031 |
| 9,715,058 B1 * | 7/2017 | Zhang | G02B 6/0036 |
| 10,754,191 B2 * | 8/2020 | Yang | G02F 1/133606 |
| 2007/0121340 A1 * | 5/2007 | Hoshi | G02B 6/0021 362/600 |
| 2009/0059125 A1 * | 3/2009 | Nagayoshi | G02F 1/133611 349/64 |
| 2010/0008628 A1 * | 1/2010 | Shani | G02B 6/0018 385/49 |
| 2010/0220484 A1 | 9/2010 | Shani et al. | |

(Continued)

FOREIGN PATENT DOCUMENTS

| | | |
|---|---|---|
| JP | 2004201330 A | 7/2004 |
| JP | 3688832 B2 | 8/2005 |

(Continued)

*Primary Examiner* — Leah Simone Macchiarolo
(74) *Attorney, Agent, or Firm* — Hunton Andrews Kurth LLP

(57) ABSTRACT

A light emitting module includes: a lightguide plate having an upper surface and a lower surface opposite to the upper surface, the upper surface including a first hole; a light emitting element on a lower surface side of the lightguide plate, the light emitting element facing the first hole; and a reflective resin layer, wherein the first hole includes a first portion and a second portion, the first portion includes a first lateral surface sloping with respect to the upper surface, the second portion has a second lateral surface sloping with respect to the upper surface, the second lateral surface being present between an opening in the upper surface and the first lateral surface of the first portion, and the reflective resin layer is located in the first portion of the first hole.

18 Claims, 12 Drawing Sheets

(56) References Cited

U.S. PATENT DOCUMENTS

| | | | | |
|---|---|---|---|---|
| 2011/0109839 | A1* | 5/2011 | Zhu | G02F 1/133606 349/62 |
| 2012/0069575 | A1* | 3/2012 | Koh | G02B 6/0036 362/296.01 |
| 2015/0116984 | A1 | 4/2015 | Dai et al. | |
| 2018/0239193 | A1 | 8/2018 | Hayashi | |
| 2018/0335559 | A1 | 11/2018 | Cho | |
| 2019/0049649 | A1 | 2/2019 | Hayashi et al. | |
| 2019/0227382 | A1 | 7/2019 | Watanabe et al. | |

FOREIGN PATENT DOCUMENTS

| | | | |
|---|---|---|---|
| JP | 2008130279 | A | 6/2008 |
| JP | 2009063684 | A | 3/2009 |
| JP | 2009150940 | A | 7/2009 |
| JP | 2012204337 | A | 10/2012 |
| JP | 2013030404 | A | 2/2013 |
| JP | 2014116104 | A | 6/2014 |
| JP | 2014220207 | A | 11/2014 |
| JP | 2018056367 | A | 4/2018 |
| JP | 2018106826 | A | 7/2018 |
| JP | 2018133304 | A | 8/2018 |
| JP | 2019012681 | A | 1/2019 |
| KR | 20100057321 | A | 5/2010 |
| WO | 2018212436 | A1 | 11/2018 |

* cited by examiner

LIGHT EMITTING MODULE

CROSS REFERENCE TO RELATED APPLICATION

This application claims priority to Japanese Patent Application No. 2019-039973, filed on Mar. 5, 2019, and Japanese Patent Application No. 2019-084913, filed on Apr. 26, 2019, the disclosures of which are hereby incorporated by reference in their entireties.

BACKGROUND

The present disclosure relates to a light emitting module.

A backlight device consisting of a plurality of backlight units each including a lightguide plate is described in, for example, Japanese Patent Publication No. 2009-150940. The lightguide plate of each backlight unit has a recess at the center of a surface opposite to the emission surface, in which a LED is placed. The plurality of backlight units are arranged such that the emission surfaces of the light guide plates are coplanar and, as a whole, constitute a backlight device. According to the technique disclosed in Japanese Patent Publication No. 2009-150940, an optical sheet which includes a plurality of lens portions is provided on the emission surface side of the lightguide plate of each backlight unit, and a light-reflecting layer which has a plurality of openings is interposed between the lens portions and the light guide plate such that the evenness of light is improved. Japanese Patent Publication No. 2009-150940 also discloses that the lens portions are enlarged as the distance from the LED increases.

Japanese Patent Publication No. 2009-063684 discloses an optical unit which includes a plurality of optical elements on the upper surface side of a plurality of LEDs arranged on a substrate. In this optical unit, each of the plurality of LEDs is located inside a hole formed in a surface of a corresponding optical element which is opposite to the emission surface. In the optical unit of Japanese Patent Publication No. 2009-063684, a recess is formed in the emission surface of each optical element immediately above a LED. Also, a lens array is formed so as to surround the central portion of the emission surface at which the recess is formed. Japanese Patent Publication No. 2009-063684 discloses that a light-diffusing portion, a reflecting portion, or a light shielding portion may be provided inside the recess.

SUMMARY

Reducing the thickness of the light emitting module which includes a plurality of light sources, such as LED, while suppressing the luminance unevenness is beneficial. As the thickness of the light emitting module is reduced, for example, the size of a device which includes a light emitting module as a backlight can be further reduced.

A light emitting module according to one embodiment of the present disclosure includes: a lightguide plate having an upper surface and a lower surface that is opposite to the upper surface, the upper surface including a first hole; a light emitting element provided on a lower surface side of the lightguide plate, the light emitting element opposing the first hole; and a reflective resin layer, wherein the first hole includes a first portion and a second portion, the first portion includes a first lateral surface sloping with respect to the upper surface, the second portion has a second lateral surface sloping with respect to the upper surface, the second lateral surface being present between an opening in the upper surface and the first lateral surface of the first portion, and the reflective resin layer is located in the first portion of the first hole.

According to at least any of embodiments of the present disclosure, a light emitting module is provided which achieves improved light uniformity although its thickness is small.

DETAILED DESCRIPTION

Embodiments of the present disclosure will now be described in detail with reference to the drawings. The following embodiments are illustrative, and the light emitting module of the present disclosure is not limited thereto. For example, the numerical values, shapes, materials, steps, and the order of steps, etc., to be shown in the following embodiments are merely examples, and various modifications can be made thereto so long as they do not lead to technical contradictions. The embodiments described below are merely illustrative, and various combinations are possible so long as they do not lead to technical contradictions.

The size, the shape, etc., of the components shown in the figures may be exaggerated for ease of understanding, and they may not represent the size and the shape of the components, the size relationship therebetween in an actual light emitting module. Illustration of some components may be omitted in order to prevent the figures from becoming excessively complicated.

In the following description, components of like functions may be denoted by like reference signs and may not be described redundantly. Terms indicating specific directions and positions (e.g., "upper", "lower", "right", "left", and other terms including such terms) may be used in the description below. These terms are used merely for the ease of understanding relative directions or positions in the figure being referred to. The arrangement of components in figures from documents other than the present disclosure, actual products, actual manufacturing apparatuses, etc., may not be equal to that shown in the figure being referred to, as long as it conforms with the directional or positional relationship as indicated by terms such as "upper" and "lower" in the figure being referred to. In the present disclosure, the term "parallel" encompasses cases where two straight lines, sides, planes, etc., are in the range of about 0±5°, unless otherwise specified. In the present disclosure, the term "perpendicular" or "orthogonal" encompasses cases where two straight lines, sides, planes, etc., are in the range of about 90±5°, unless otherwise specified.

Embodiment of Surface-Emission Light Source

Figure 1:
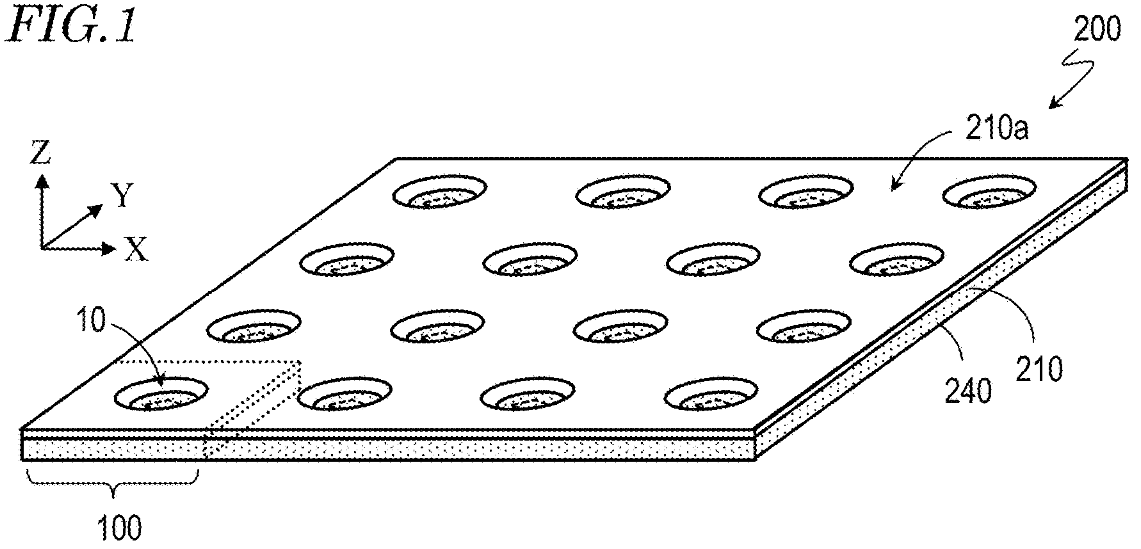
FIG. 1 is a schematic perspective view showing an example of configuration of a surface-emission light source of an embodiment of the present disclosure.

FIG. 1 shows an example of configuration of a surface-emitting light source according to one embodiment of the present disclosure. The surface-emission light source 200 shown in FIG. 1 includes a lightguide plate 210 which has an upper surface 210*a* and a light-reflective member 240 in the shape of a layer located under the lightguide plate 210. Note that FIG. 1 also shows arrows in the x direction, the y direction and the Z direction, which are orthogonal to each other, for the purpose of illustration. Arrows indicating these directions may be also shown in other figures of the present disclosure.

The surface-emitting light source 200 has a plate shape as an entirety. The upper surface 210*a* of the lightguide plate 210 forms an emission surface of the surface-emitting light source 200, and typically has a rectangular shape. Herein, the x direction and the y direction described above respectively coincide with one and the other of mutually orthogonal sides of the rectangular shape of the lightguide plate 210. The length of one side of the rectangular shape of the lightguide plate 210 is in the range of, for example, not less than 1 to 200 cm. In one embodiment of the present disclosure, one side of the rectangular shape of the upper surface 210*a* of the lightguide plate 210 has a length of not less than 20 mm and not more than 25 mm. The longitudinal length and the transverse length of the rectangular shape of the upper surface 210*a* can be, for example, about 24.3 mm and about 21.5 mm, respectively.

In the configuration illustrated in FIG. 1, the surface-emission light source 200 is a collective body of a plurality of light emitting modules 100 each of which includes at least one light emitting element. As schematically shown in FIG. 1, in this example, the surface-emission light source 200 includes 16 light emitting modules 100 in total which are two-dimensionally arrayed. Herein, the 16 light emitting modules 100 are arrayed in 4 rows and 4 columns. The number of light emitting modules 100 included in the surface-emission light source 200 and the arrangement of the light emitting modules 100 are arbitrary and not limited to the configuration shown in FIG. 1.

As shown in FIG. 1, each of the light emitting modules 100 includes a first hole 10 which includes, in its part, an opening at the upper surface 210*a* of the lightguide plate 210. As will be described later, the surface-emission light source 200 can include an optical sheet, such as diffuser sheet, prism sheet, or the like, which is located on the upper surface 210*a* side of the lightguide plate 210 so as to cover the first holes 10. The number of diffuser sheets located on the upper surface 210*a* side of the lightguide plate 210 may be one or may be two or more. Likewise, the number of prism sheets located on the upper surface 210*a* side of the lightguide plate 210 may be one or may be two or more.

As will be described later in detail, the light emitting element of each of the light emitting modules 100 is located at a position generally immediately under the first hole 10. In this example, corresponding to the array of the light emitting modules 100 in 4 rows and 4 columns, the light emitting elements are arrayed in 4 rows and 4 columns along the X direction and the Y direction. The arrangement pitch of the light emitting elements can be, for example, in a range of about 0.05 to 20 mm, and may be in the range of about 1 to 10 mm. Herein, the arrangement pitch of the light emitting elements refers to the distance between the optical axes of the light emitting elements. The light emitting elements may be arranged at regular intervals or may be arranged at irregular intervals. The arrangement pitch of the light emitting elements may be equal, or may be different, between two different directions.

Figure 2:
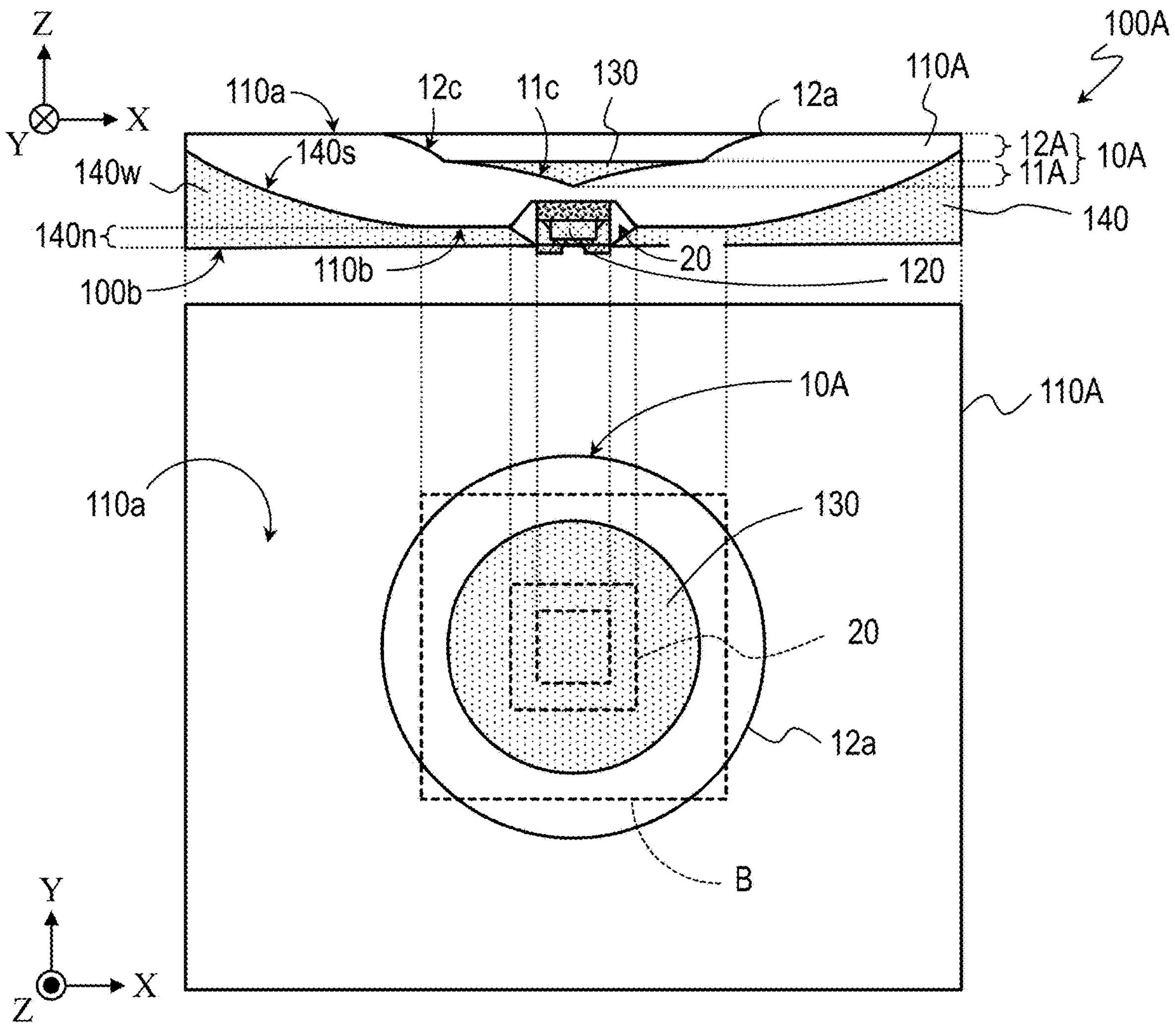
FIG. 2 schematically shows a schematic cross section of an example of a light emitting module shown in FIG. 1 and an example of external appearance of the light emitting module as viewed from the upper surface side of a lightguide plate.

FIG. 2 shows a light emitting module 100A which is an example of the light emitting module 100. In FIG. 2, a cross section of the light emitting module 100A taken along a plane perpendicular to the upper surface 210*a* of the lightguide plate 210 in the vicinity of the center of the light emitting module 100A and an exemplary external appearance of the light emitting module 100A as viewed from the upper surface 210*a* side of the lightguide plate 210 in a direction perpendicular to the upper surface 210*a* are schematically shown together in a single drawing.

The light emitting module 100A includes a lightguide plate 110A, a light emitting element 120 and a reflective resin layer 130. The lightguide plate 110A has an upper surface 110*a* that includes a first hole 10A and a lower surface 110*b* that is opposite to the upper surface 110*a*. The reflective resin layer 130 is provided inside the first hole 10A. The lightguide plate 110A may be a part of the lightguide plate 210 shown in FIG. 1. The first hole 10A of the lightguide plate 110A may be one of the plurality of first holes 10 shown in FIG. 1. Note that the lightguide plate 110A may be in the form of a single lightguide plate which is continuous between two adjoining light emitting modules 100A in the surface-emission light source 200. Note that, however, for example, when each light emitting module 100A includes an independent lightguide plate 110A, a definite border may be found between the lightguide plates 110A of two light emitting modules 100A in the surface-emission light source 200.

In the configuration illustrated in FIG. 2, the light emitting module 100A may further include a light-reflective member 140 which is located on the lower surface 110*b* side of the lightguide plate 110A. The light-reflective member 140 is a part of the light-reflective member 240 shown in FIG. 1. In this example, the light-reflective member 140 includes a basal portion 140*n* which is in the shape of a layer and a wall portion 140*w* rising from the lower surface 110*b* side of the lightguide plate 110A to the upper surface 110*a* side of the lightguide plate 110A. The wall portion 140*w* has a slope surface 140*s* which surrounds the light emitting element 120. In the lower part of FIG. 2, the rectangle B, which is the outermost one of the broken line rectangles, represents the position of the inner periphery of the wall portion 140*w*. In the example described herein, the inner periphery of the wall portion 140*w* is rectangular, although the inner periphery of the wall portion 140*w* may have any other shape, such as circular, elliptical, etc. As is the lightguide plate 110A, the light-reflective member 140 can be continuous so as to extend across two adjoining light emitting modules 100A in the surface-emission light source 200.

The first hole 10A of the lightguide plate 110A is provided in the vicinity of the center of the upper surface 110*a*. Herein, the first hole 10A includes a first portion 11A which has a first lateral surface 11*c* sloping with respect to the upper surface 110*a* and a second portion 12A which has a second lateral surface 12*c* sloping with respect to the upper surface 110*a*. As shown in the drawing, the second lateral surface 12*c* of the second portion 12A may be part of one or more lateral surfaces which define the shape of the first hole 10A which is present between an opening 12*a* located at the upper surface 110*a* of the lightguide plate 110A and the first lateral surface 11*c* of the first portion 11A. The degree of the inclination of the first lateral surface 11*c* with respect to the upper surface 110*a* may be different from the degree of the inclination of the second lateral surface 12*c* with respect to the upper surface 110*a*. In this example, the first portion 11A of the first hole 10A generally has the shape of an inverted cone, and the second portion 12A of the first hole 10A has the shape of an inverted truncated cone.

In the light emitting module 100A, the light emitting element 120 is located on the lower surface 110*b* side of the lightguide plate 110A so as to oppose the first hole 10A provided in the upper surface 110*a* of the lightguide plate 110A. In the example shown in FIG. 2, a second hole 20 is provided at the lower surface 110*b* side of the lightguide plate 110A, and the light emitting element 120 is located inside this second hole 20 in a plan view. The optical axis of the light emitting element 120 is generally coincident with the center of the first hole 10A.

As previously described, the reflective resin layer 130 of each light emitting module 100A is located inside the first hole 10A. In the present embodiment, the reflective resin layer 130 is in the first portion 11A that is part of the first hole 10A which is closer to the light emitting element 120. In this example, the reflective resin layer 130 is arranged so as to occupy the entirety of the first portion 11A inside the first hole 10A.

As will be described later, the reflective resin layer 130 may contain or be made of a light-reflective material. The first hole 10A is provided at a position in the lightguide plate 110A which opposes the light emitting element 120 and, therefore, light emitted from the light emitting element 120 can be reflected at a position on the lateral surface which defines the shape of the first hole 10A. Particularly, in an embodiment of the present disclosure, the first hole 10A, which includes the first portion 11A that has the first lateral surface 11*c* and the second portion 12A that has the second lateral surface 12*c*, is provided on the upper surface 110*a* side of the lightguide plate 110A and, therefore, the first lateral surface 11*c* and the second lateral surface 12*c*, which have inclinations of different degrees with respect to the upper surface 110*a*, are used as a reflection surface such that light from the light emitting element 120 can be more efficiently diffused throughout the plane of the lightguide plate 110A. Further, since the reflective resin layer 130 is arranged so as to oppose the light emitting element 120, the luminance in a region of the upper surface 110*a* of the lightguide plate 110A immediately above the light emitting element 120 can be prevented from being excessively higher than in the other regions. Herein, since the reflective resin layer 130 is selectively provided inside the first portion 11A of the first hole 10A, excessive decrease of the luminance in the region immediately above the light emitting element 120 can be avoided. As a result, light of improved uniformity can be realized while the overall thickness of the light emitting module 100A is reduced.

Hereinafter, the constituents of the light emitting module 100A will be described in more detail.

Lightguide Plate 110A

The lightguide plate 110A has the function of diffusing light from the light emitting element 120 and emitting it from the upper surface 110*a*. In the present embodiment, an aggregate of the upper surfaces 110*a* of the plurality of lightguide plates 110A constitute the light emitting surface of the surface-emission light source 200.

The lightguide plate 110A is a generally plate-shaped light-transmitting member that may be formed of at least one of a thermoplastic resin such as acrylic, polycarbonate, cyclic polyolefin, polyethylene terephthalate and polyester, a thermosetting resin such as epoxy and silicone, glass, and combinations thereof. Particularly, polycarbonate, among others, can realize a high transparency while being inexpensive. Note that the terms "light-transmitting" and "light transmission" as used herein are understood to encompass diffusiveness for incident light, and not limited to being "transparent". The lightguide plate 110A may have a light diffusion function by including a material dispersed therein that has a different refractive index than that of the base material, for example.

The first hole 10A provided in the upper surface 110*a* of the lightguide plate 110A has the function of reflecting light emitted from the light emitting element 120 and then introduced from the lower surface 110*b* side of the lightguide plate 110A such that the reflected light diffuses throughout the plane of the lightguide plate 110A. By providing the first hole 10A as such a light-diffusing structure in the lightguide plate 110A, the luminance can be improved at the upper surface 110*a* exclusive of the region immediately above the light emitting element 120. That is, the luminance unevenness across the upper surface of the light emitting module 100A can be suppressed, and the first hole 10A as the light-diffusing structure contributes to reduction in thickness of the lightguide plate 110A. The thickness of the lightguide plate 110A, i.e., the distance from the lower surface 110*b* to the upper surface 110*a*, is typically in a range of about 0.1 to 5 mm. According to certain embodiments of the present disclosure, the thickness of the lightguide plate 110A can be within the range of not more than about 750 μm.

Figure 3:
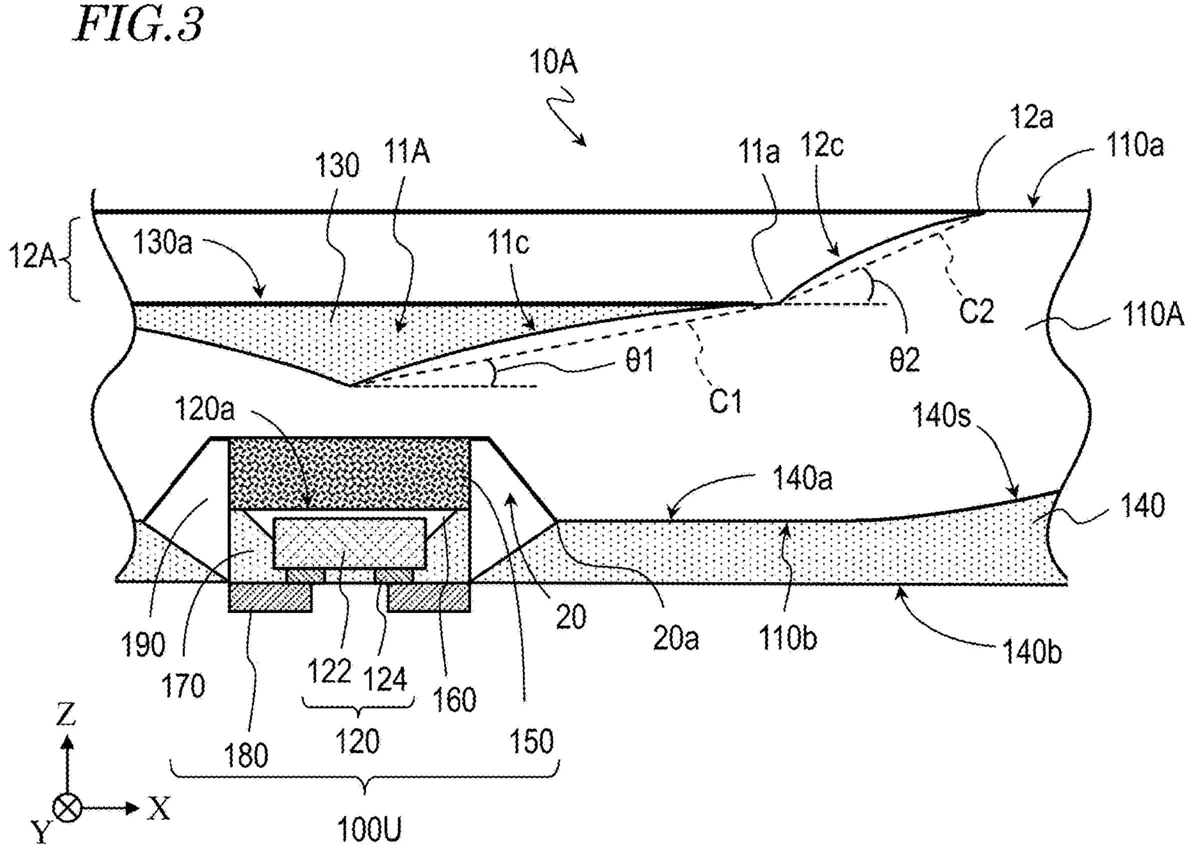
FIG. 3 is a schematic enlarged view showing part of FIG. 2 including a light emitting element and its vicinity.

FIG. 3 enlargedly shows part of FIG. 2 including the light emitting element 120 and its vicinity. In the present embodiment, the first hole 10A includes the first portion 11A that has the first lateral surface 11*c* and the second portion 12A that has the second lateral surface 12*c*. As previously described, the reflective resin layer 130 is located inside the first portion 11A. In the example shown in FIG. 2 and FIG. 3, the entirety of the first portion 11A is filled with the reflective resin layer 130. For example, when the entirety of the first portion 11A is filled with the reflective resin layer 130 and the entirety of the first lateral surface 11*c* is covered with the reflective resin layer 130, light introduced into the lightguide plate 110A and traveling to the first hole 10A can be effectively reflected at the first lateral surface 11*c*.

As shown in FIG. 3, in this example, the inclination of the first lateral surface 11*c* with respect to the upper surface 110*a* of the lightguide plate 110A is smaller than the inclination of the second lateral surface 12*c*. Due to such a shape of the first hole 10A, the area of the first lateral surface 11*c* can be increased while increase in depth of the first hole 10A is suppressed. Therefore, light incident on the first lateral surface 11*c* can be more effectively diffused throughout the plane of the lightguide plate 110A while increase in thickness of the lightguide plate 110A is avoided. On the contrary, the inclination of the second lateral surface 12*c* with respect to the upper surface 110*a* of the lightguide plate 110A may be smaller than the inclination of the first lateral surface 11*c*. Due to such a configuration, the capacity of the second portion 12A can be increased while increase in thickness of the lightguide plate 110A is avoided. For example, the air layer in the first hole 10A can be enlarged to a broader area. Accordingly, a greater amount of light is incident on the second lateral surface 12*c*, and the light can be more effectively diffused throughout the plane of the lightguide plate 110A.

In the configuration illustrated in FIG. 3, the cross-sectional shape of the first lateral surface 11*c* of the first portion 11A of the first hole 10A and the cross-sectional shape of the second lateral surface 12*c* of the second portion 12A are both curved. In this case, the degree of the inclination of the first lateral surface 11*c* and the second lateral surface 12*c* can be defined as follows.

The degree of the inclination of the first lateral surface 11*c* can be defined by the angle formed by a line extending between the lower end and the upper end of the first lateral surface 11*c* and a line parallel to the upper surface 110*a* of the lightguide plate 110A in a cross-sectional view. Likewise, the degree of the inclination of the second lateral surface 12*c* can also be defined by the angle formed by a line extending between the lower end and the upper end of the second lateral surface 12*c* and a line parallel to the upper surface 110*a* of the lightguide plate 110A in a cross-sectional view. Note that, however, in this example, the cross-sectional shape of the first lateral surface 11*c* and the cross-sectional shape of the second lateral surface 12*c* are both curved. In such a case, the degree of the inclination can be determined as follows.

Herein, the first portion 11A of the first hole 10A generally has the shape of an inverted cone. Therefore, the first portion 11A has an opening 11*a* inside the first hole 10A, and the opening 11*a* corresponds to the periphery of the base of the inverted cone shape of the first portion 11A. Herein, the angle θ1 formed by a line C1 in FIG. 3 and a line parallel to the upper surface 110*a* of the lightguide plate 110A represents the degree of the inclination of the first lateral surface 11*c*. The line C1 is a line extending between a part of the first portion 11A at which the distance from the lower surface 110*b* of the lightguide plate 110A is smallest (in this example, the apex of the inverted cone) and the opening 11*a*. Likewise, the angle θ2 formed by the line C2 in FIG. 3 extending between the opening 11*a* of the first portion 11A and the opening 12*a* of the second portion 12A and a line parallel to the upper surface 110*a* of the lightguide plate 110A represents the degree of the inclination of the second lateral surface 12*c*.

Herein, the cross-sectional shape of the first lateral surface 11*c* and the second lateral surface 12*c* is curved. However, the cross-sectional shape of the first lateral surface 11*c* and the second lateral surface 12*c* is not limited to a curved shape but may be a bent and/or stepped shape or a linear shape. The cross-sectional shape of the first lateral surface 11*c* and the cross-sectional shape of the second lateral surface 12*c* do not need to be identical with each other. If the cross-sectional shape of the first lateral surface 11*c* and/or the second lateral surface 12*c* is a curved shape such as illustrated in FIG. 3, particularly a curve which is convex toward the inside of the first hole 10A, light is likely to diffuse to positions away from the center of the lightguide plate 110A. This is advantageous from the viewpoint of achieving uniform light on the upper surface 110*a* side.

In this example, the inside of the second portion 12A of the first hole 10A is not filled with a resin or the like, i.e., is the air layer. In other words, the inside of the second portion 12A has a lower refractive index than the first portion 11A. Therefore, in this example, the second lateral surface 12*c* of the second portion 12A is the interface between the air layer and the lightguide plate 110A and functions as a reflection surface such that light introduced into the lightguide plate 110A and traveling toward the first hole 10A is brought back into the lightguide plate 110A. That is, the second lateral surface 12*c* of the second portion 12A enables light which is incident on the upper surface 110*a* of the lightguide plate 110A at a near-vertical angle to diffuse into the lightguide plate 110A. The second portion 12A may be filled with a material which has a lower refractive index than the material of the reflective resin layer 130.

The specific shape of the first hole 10A is not limited to the shape illustrated in FIG. 3. The specific configuration of the first hole 10A as the light-diffusing structure can be appropriately determined according to the shape and characteristics of the light emitting element located on the lower surface 110*b* side of the lightguide plate 110A. The shape of the first portion 11A and the second portion 12A of the first hole 10A may be the shape of, for example, a cone, a polygonal pyramid such as quadrangular pyramid, hexagonal pyramid, etc., or a truncated polygonal pyramid. The depth of the first hole 10A is in the range of, for example, not less than 300 μm and not more than 400 μm. The depth of the first portion 11A can be in the range of, for example, not less than 100 μm and not more than 200 μm. The diameter of the opening 11*a* of the first portion 11A can be, for example, about 2 mm. The diameter of the opening 12*a* of the second portion 12A can be, for example, about 3 mm.

The lightguide plate 110A may be a single layer, or may have a layered structure including a plurality of light-transmitting layers. When a plurality of light-transmitting layers are layered together, a layer having a different refractive index, e.g., an air layer, or the like, may be provided between any layers. With the provision of an air layer, for example, between any layers of the layered structure, it may be easier to diffuse light from the light emitting element 120 and it allows to further reduce the unevenness in luminance.

In the illustrated example, the lightguide plate 110A has the second hole 20 on the lower surface 110*b* side at a position opposite to the first hole 10A. Inside the second hole 20, a bonding member 190 and a light emitter 100U that includes the light emitting element 120 are provided. The light emitter 100U includes a plate-like wavelength conversion member 150, a bonding member 160 and a second light-reflective member 170 in addition to the light emitting element 120. The light emitter 100U is bonded at the position of the second hole 20 of the lightguide plate 110A by the bonding member 190.

As seen from FIG. 2, the second hole 20 has the shape of, for example, a truncated quadrangular pyramid. Typically, the center of the second hole 20 that is located on the lower surface 110*b* side of the lightguide plate 110A is approximately coincident with the center of the first hole 10A that is located on the upper surface 110*a* side. A dimension of an opening 20*a* of the second hole 20 which is formed at the lower surface 110*b* of the lightguide plate 110A along a diagonal direction of the rectangular shape can be, for example, in range of 0.05 to 10 mm, preferably not less than 0.1 mm and not more than 1 mm.

When the planar shape of the second hole 20 is rectangular, the second hole 20 may be formed at the lower surface 110*b* of the lightguide plate 110A such that one side of the rectangular shape of the second hole 20 is parallel to one side of the rectangular shape of the lightguide plate 110A as shown in FIG. 2. Alternatively, as shown in FIG. 6, the second hole 20 may be formed at the lower surface 110*b* of the lightguide plate 110A so as to be inclined with respect to one side of the rectangular shape of the lightguide plate 110A.

Figure 6:
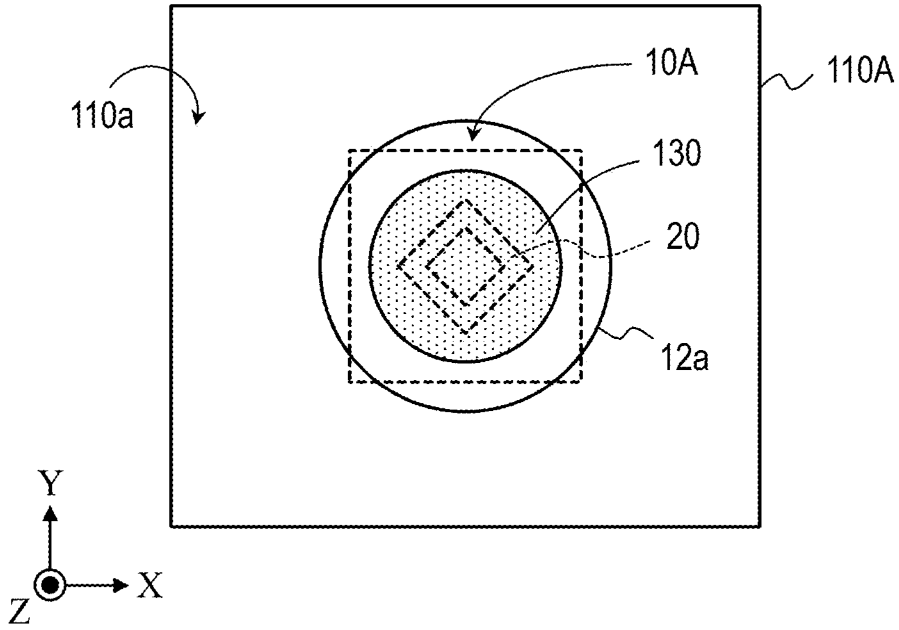
FIG. 6 is a schematic plan view showing another example of the external appearance when the light emitting module is viewed in the normal direction of the upper surface of the lightguide plate.

FIG. 6 shows an example where the rectangular shape of the opening 20*a* of the second hole 20 is inclined by 45° with respect to the rectangular shape of the lightguide plate 110A. As illustrated in FIG. 6, by forming the second hole such that each side of the rectangular shape of the opening 20*a* is generally parallel to the diagonal line of the rectangular shape of the lightguide plate 110A, the four lateral surfaces of the second hole 20 face the corners of the rectangular shape of the lightguide plate 110A. That is, the distance from the corners of the truncated quadrangular pyramid shape of the second hole 20 to the lateral surfaces of the lightguide plate 110A can be decreased while the distance from the lateral surfaces of the second hole 20 to the corners of the lightguide plate 110A is increased. According to the optical characteristics of the light emitter 100U, such a configuration can more strongly suppress the luminance unevenness.

Examples of the planar shape of the second hole 20 include not only rectangular shapes such as shown in FIG. 2 and FIG. 6 but also circular shapes. It is not indispensable for an embodiment of the present disclosure that the external shape of the second hole 20 is similar to the external shape of the lightguide plate 110A. The shape and size of the second hole 20 can be appropriately determined according to required optical characteristics. For example, the second hole 20 may have the shape of a truncated cone.

Reflective Resin Layer 130

Again, refer to FIG. 3. As previously described, the reflective resin layer 130 is located in the first portion 11A of the first hole 10A. It is not indispensable for an embodiment of the present disclosure that the entirety of the first portion 11A is filled with the reflective resin layer 130. The reflective resin layer 130 may occupy part of the first portion 11A. For example, the reflective resin layer 130 may be provided in the first hole 10A so as to cover the first lateral surface 11*c* of the first portion 11A.

The reflective resin layer 130 is made of a light-reflective material such as, for example, a resin material in which a light-reflective filler is dispersed. In this specification, the terms "reflective" and "light-reflective" refer to a circumstance where the reflectance at the emission peak wavelength of the light emitting element 120 is not less than 60%. The reflectance of the reflective resin layer 130 at the emission peak wavelength of the light emitting element 120 is more beneficially not less than 70%, still more beneficially not less than 80%.

The base material of a resin material used for forming the light-reflective resin layer 130 can be a silicone resin, a phenolic resin, an epoxy resin, a BT resin, a polyphthalamide (PPA), etc. The light-reflective filler used can be metal particles, or particles of an inorganic or organic material which has a higher refractive index than the base material. Examples of the light-reflective filler include particles of titanium dioxide, silicon oxide, zirconium dioxide, potassium titanate, aluminum oxide, aluminum nitride, boron nitride, mullite, niobium oxide, barium sulfate, or particles of various rare earth oxides such as yttrium oxide and gadolinium oxide. It is beneficial that the reflective resin layer 130 is white.

Figure 4:
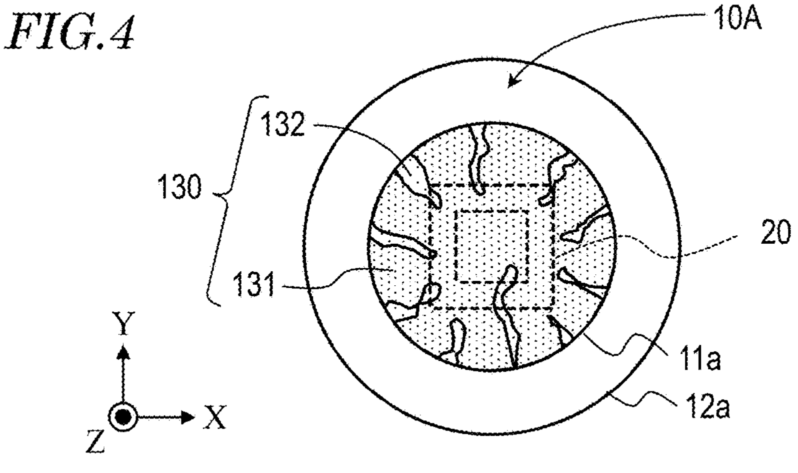
FIG. 4 is a schematic enlarged view when the vicinity of the first hole is viewed in the normal direction of the upper surface of the lightguide plate, showing another example of the shape of a reflective resin layer.
Figure 5:
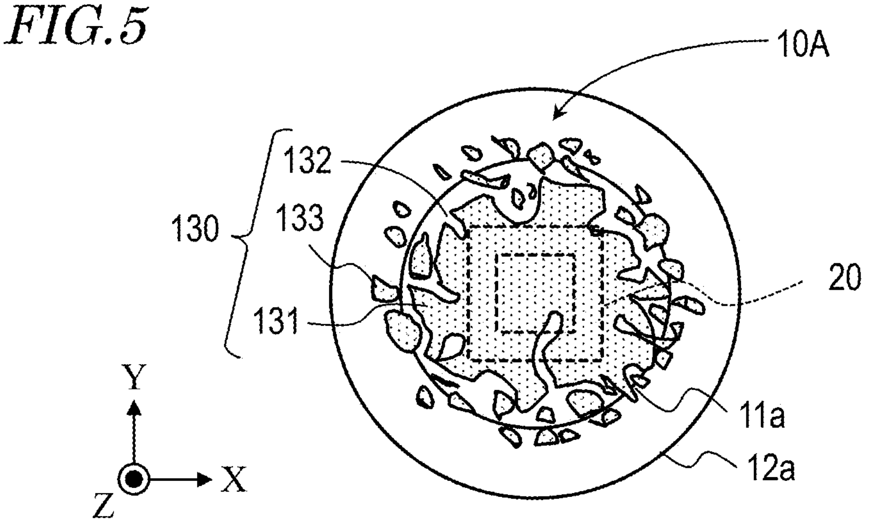
FIG. 5 is a schematic enlarged view when the vicinity of the first hole is viewed in the normal direction of the upper surface of the lightguide plate, showing still another example of the shape of the reflective resin layer.

The distribution of the light-reflective filler in the reflective resin layer 130 may be generally uniform throughout the reflective resin layer 130 or may be nonuniform or gradient. For example, if in the step of forming the reflective resin layer 130 the filler precipitates or separates from the base material before the base material is cured, the distribution of the light-reflective filler in the reflective resin layer 130 can be nonuniform. For example, as shown in FIG. 4, the reflective resin layer 130 can include a first region 131 and second regions 132 in which the density of the filler is relatively low. In the example shown in FIG. 4, there are a plurality of second regions 132 extending from the periphery to the center of the first hole 10A. Alternatively, as in the example shown in FIG. 5, the reflective resin layer 130 can include a plurality of island portions 133 in the vicinity of the opening 11*a* of the first portion 11A.

If the number density of the filler which is defined by the number of the filler per unit area in a plan view is relatively high in the vicinity of the center of the reflective resin layer 130 as compared with the vicinity of the periphery of the reflective resin layer 130, the luminance in a region immediately above the light emitting element 120 can readily be prevented from being locally excessively high and, therefore, this is beneficial. In each of the examples shown in FIG. 4 and FIG. 5, the number density of the filler is relatively high in the vicinity of the center of the reflective resin layer 130 as compared with the vicinity of the periphery of the reflective resin layer 130.

When the reflective resin layer 130 is located above the light emitting element 120, light emitted from the light emitting element 120 traveling toward the upper surface

110*a* of the lightguide plate 110A in the vicinity of the center of the lightguide plate 110A can be reflected by the reflective resin layer 130. Therefore, light emitted from the light emitting element 120 can be efficiently diffused throughout the plane of the lightguide plate 110A. Also, the luminance in a region of the upper surface 110*a* of the lightguide plate 110A immediately above the light emitting element 120 can be prevented from being locally excessively high. Note that, however, it is not indispensable that the reflective resin layer 130 completely blocks light from the light emitting element 120. In this sense, the reflective resin layer 130 may have a semi-transmissive property such that the reflective resin layer 130 transmits part of the light from the light emitting element 120.

Herein, the upper surface 130*a* of the reflective resin layer 130 is generally flat. Note that, however, the shape of the upper surface 130*a* of the reflective resin layer 130 is not limited to this example but may be convexed toward the side opposite to the light emitting element 120 or concaved toward the light emitting element 120 side. Particularly, when the upper surface 130*a* of the reflective resin layer 130 is convexed toward the side opposite to the light emitting element 120, the thickness in the vicinity of the center of the reflective resin layer 130 relative to the position of the opening 11*a* of the first portion 11A is relatively large. As a result, the luminance in a region immediately above the light emitting element 120 can be more effectively prevented from being locally excessively high.

In the example shown in FIG. 3, the reflective resin layer 130 fills the space between the deepest part of the first portion 11A and the position of the opening 11*a*. In other words, in this example, the reflective resin layer 130 does not reach a higher level beyond the position of the opening 11*a* inside the first hole 10A. However, it is not indispensable for an embodiment of the present disclosure that the reflective resin layer 130 does not include a portion beyond the position of the opening 11*a*. It is tolerable that the reflective resin layer 130 includes a portion which is present inside the second portion 12A of the first hole 10A. If the inclination of the first lateral surface 11*c* is smaller than the inclination of the second lateral surface 12*c*, increase in area of the reflective resin layer 130 in the first hole 10A in a plan view can readily be suppressed even though part of the reflective resin layer 130 reaches the inside of the second portion 12A. That is, excessively low luminance in the vicinity of the first hole 10A can readily be avoided.

Light Emitting Element 120

Typical examples of the light emitting element 120 include an LED. In the configuration illustrated in FIG. 3, the light emitting element 120 includes a main body 122, and an electrode 124 located on the side opposite to the upper surface 120*a* of the light emitting element 120. For example, the main body 122 may include a support substrate of sapphire or gallium nitride, etc., and a semiconductor layered structure on the support substrate. The semiconductor layered structure includes an n-type semiconductor layer, a p-type semiconductor layer, and an active layer interposed between these semiconductor layers. The semiconductor layered structure may include a nitride semiconductor ($In_xAl_yGa_{1-x-y}N$, $0 \le x$, $0 \le y$, $x+y \le 1$) capable of emitting light in the ultraviolet to visible range. In this example, the upper surface 120*a* of the light emitting element 120 coincides with the upper surface of the main body 122. The electrode 124 may include a pair of a positive electrode and a negative electrode, and may have the function of supplying a predetermined current to the semiconductor layered structure.

The light emitting elements 120 provided in the surface-emission light source 200 may each be an element that emits blue light or may be an element that emits white light. The light emitting elements 120 may include elements that emit light of different colors from each other. For example, the light emitting elements 120 may include elements that emit red light, elements that emit blue light, and elements that emit green light. Herein, an LED that emits blue light is shown as an example of the light emitting element 120.

In this example, in each light emitting module 100A, the light emitting element 120 is secured to the lower surface of the wavelength conversion member 150 by the bonding member 160. The planar shape of the light emitting element 120 is typically a rectangular shape. One side of the rectangular light emitting element 120 has a length of, for example, 1000 μm or shorter. The light emitting element 120 may have a length of 500 μm or shorter in each of the longitudinal direction and the transverse direction. A light emitting element having a length of 500 μm or shorter in each of the longitudinal direction and the transverse direction is easily available at low cost. Alternatively, the light emitting element 120 may have a length of 200 μm or shorter in each of the longitudinal direction and the transverse direction. A light emitting element having such short sides is advantageous to represent a high definition video, and/or to perform a local dimming operation or the like when being applied to a backlight unit of a liquid crystal display device. Particularly, a light emitting element having a length of 250 μm or shorter both in the longitudinal direction and the transverse direction has a small area size of the upper surface thereof, and therefore, outputs a relatively large amount of light from a side surface thereof. Therefore, it is easy to obtain a batwing light distribution characteristic. Herein, a batwing light distribution characteristic generally refers to a light distribution characteristic that is defined as an emission intensity distribution such that the emission intensity is higher at angles at which the absolute value of the light distribution angle is greater than 0°, where 0° is the optical axis that is perpendicular to the upper surface of the light emitting element.

Wavelength Conversion Member 150

In the configuration illustrated in FIG. 3, the wavelength conversion member 150 is located inside the second hole 20 between the lightguide plate 110A and the light emitting element 120. In other words, the wavelength conversion member 150 is located at a position which is above the light emitting element 120 and which is at the bottom portion of the second hole 20. Herein, "the bottom portion of the second hole 20" means a portion of the second hole 20 which is considered as the bottom portion when the lower surface 110*b* of the lightguide plate 110A is oriented upward. In this specification, the terms "bottom portion" and "bottom surface" can also be used without being bound by the orientation of the light emitting module depicted in the figure. When the light emitting module 100A is in the orientation shown in FIG. 3, the bottom portion of the second hole 20 can also be said to be a ceiling portion of the dome-shaped structure formed on the lower surface 110*b* side of the lightguide plate 110A.

The wavelength conversion member 150 absorbs at least part of light emitted from the light emitting element 120 and emits light at a wavelength different from the wavelength of the light from the light emitting element 120. For example, the wavelength conversion member 150 may convert part of blue light from the light emitting element 120 and emit yellow light. With such a configuration, blue light which has passed through the wavelength conversion member 150 and yellow light emitted from the wavelength conversion member 150 are mixed together, resulting in white light. In the configuration illustrated in FIG. 3, light emitted from the light emitting element 120 is basically guided into the lightguide plate 110A via the wavelength conversion member 150. Therefore, the mixed light may be diffused inside the lightguide plate 110A and, for example, white light with suppressed luminance unevenness may be extracted from the upper surface 110*a* of the lightguide plate 110A. The embodiment of the present disclosure is advantageous in achieving uniform light as compared with a case where light is first diffused in the lightguide plate and then the wavelength thereof is converted.

The wavelength conversion member 150 is, typically, a member in which phosphor particles are dispersed in a resin. Examples of the resin in which the phosphor particles are to be dispersed include silicone resins, modified silicone resins, epoxy resins, modified epoxy resins, urea resins, phenolic resins, acrylic resins, urethane resins, fluoric resins, and a resin containing two or more of these resins. From the viewpoint of efficiently guiding light into the lightguide plate 110A, it is beneficial that the base material of the wavelength conversion member 150 has a lower refractive index than the material of the lightguide plate 110A. A material which has a different refractive index from that of the base material may be dispersed in the material of the wavelength conversion member 150 such that the wavelength conversion member 150 can have a light diffusion function. For example, particles of titanium dioxide, silicon oxide, or the like, or combinations thereof may be dispersed in the base material of the wavelength conversion member 150.

The phosphor may be a known material. Examples of the phosphor include YAG-based phosphors, fluoride-based phosphors such as KSF-based phosphors, nitride-based phosphors such as CASN, and β-SiAlON phosphors, and combinations thereof. The YAG-based phosphors are examples of a wavelength converting substance which is capable of converting blue light to yellow light. The KSF-based phosphors and CASN are examples of a wavelength converting substance which is capable of converting blue light to red light. The β-SiAlON phosphors are examples of a wavelength converting substance which is capable of converting blue light to green light. The phosphor may be a quantum dot phosphor.

It is not indispensable that the phosphor contained in the wavelength conversion member 150 is the same among a plurality of light emitting modules 100 included in the same surface-emission light source 200. Among the plurality of light emitting modules 100, the phosphor dispersed in the base material of the wavelength conversion member 150 may differ. In some of a plurality of second holes 20 provided in the lightguide plate 210 of the surface-emission light source 200, a wavelength conversion member which is capable of converting incident blue light to yellow light may be provided and, in some others of the second holes 20, a wavelength conversion member which is capable of converting incident blue light to green light may be provided. Further, in the remaining second holes 20, a wavelength conversion member which is capable of converting incident blue light to red light may be provided.

Bonding Member 160

The bonding member 160 is a light-transmitting member that covers at least part of a lateral surface of the light emitting element 120. As schematically shown in FIG. 3, the bonding member 160 typically includes a layer-shaped portion that is located between the upper surface 120*a* of the light emitting element 120 and the wavelength conversion member 150.

The material of the bonding member 160 can be a resin composition which contains a transparent resin material as the base material. The bonding member 160 has a transmittance of, for example, not less than 60% for light which has the emission peak wavelength of the light emitting element 120. From the viewpoint of effectively using light, the transmittance of the bonding member 160 at the emission peak wavelength of the light emitting element 120 is beneficially not less than 70%, more beneficially not less than 80%.

Typical examples of the base material of the bonding member 160 include a thermosetting resin such as an epoxy resin or a silicone resin. Examples of the base material of the bonding member 160 include a silicone resin, a modified silicone resin, an epoxy resin, a phenol resin, a polycarbonate resin, an acrylic resin, a polymethylpentene resin or a polynorbornene resin, or a material containing two or more of these resins. The bonding member 160 typically has a lower refractive index than the refractive index of the lightguide plate 110A. In the bonding member 160, for example, a material which has a different refractive index from the base material may be dispersed such that the bonding member 160 has a light diffusion function.

As previously described, the bonding member 160 covers at least portion of the lateral surface of the light emitting element 120. The bonding member 160 has an outer surface which is the interface with the light-reflective member 170 which will be described later. Light emitted from the lateral surface of the light emitting element 120 so as to be incident on the bonding member 160 is reflected at the position of the outer surface of the bonding member 160 toward a region lying above the light emitting element 120. The cross-sectional shape of the outer surface of the bonding member 160 is not limited to a linear shape such as shown in FIG. 3. The cross-sectional shape of the outer surface of the bonding member 160 may be a zigzag line, a curve which is convex in a direction toward the light emitting element 120, or a curve which is convex in a direction away from the light emitting element 120.

(Second) Light-Reflective Member 170

The light-reflective member 170 is a member which is located on the lower surface side of the wavelength conversion member 150 (on a side opposite to the lightguide plate 110A) and which is capable of reflecting light. As shown in FIG. 3, the light-reflective member 170 covers the outer surface of the bonding member 160, part of the lateral surface of the light emitting element 120 which is not covered with the bonding member 160, and the lower surface of the light emitting element 120 which is opposite to the upper surface 120*a* exclusive of the electrode 124. The light-reflective member 170 covers the lateral surface of the electrode 124, while the lower surface of the electrode 124 is exposed out of the lower surface of the light-reflective member 170.

The material of the light-reflective member 170 can be similar to the material of the reflective resin layer 130. For example, the material of the light-reflective member 170 and the material of the reflective resin layer 130 may be the same. The lower surface of the light emitting element 120, exclusive of the electrode 124, is covered with the light-reflective member 170, whereby leakage of light to the side opposite to the upper surface 110*a* of the lightguide plate 110A can be suppressed. Further, the light-reflective member 170 also covers the lateral surface of the light emitting element 120 so that light from the light emitting element 120 can be converged at a higher place and efficiently guided into the wavelength conversion member 150.

Second Bonding Member 190

As previously described, the light emitter 100U is provided at the bottom portion of the second hole 20 by means of the second bonding member 190. As shown in FIG. 3, at least part of the second bonding member 190 is located inside the second hole 20. The second bonding member 190 may include a portion which is present between the bottom portion of the second hole 20 and the wavelength conversion member 150. As shown in FIG. 3, the second bonding member 190 can include a portion raised toward the side opposite to the upper surface 110*a* of the lightguide plate 110A beyond the lower surface 110*b* of the lightguide plate 110A.

The second bonding member 190 is made of a resin composition which contains a transparent resin material as the base material as is the bonding member 160. The material of the second bonding member 190 may be the same as, or may be different from, the material of the bonding member 160. The second bonding member 190 typically has a lower refractive index than the refractive index of the lightguide plate 110A.

Light-Reflective Member 140

The light-reflective member 140 is capable of reflecting light and covers at least part of the lower surface 110*b* of the lightguide plate 110A. Herein, the light-reflective member 140 may cover not only the lower surface 110*b* of the lightguide plate 110A but also the second bonding member 190. When the second bonding member 190 is covered with the light-reflective member 140 as in this example, leakage of light from the second bonding member 190 to the lower surface 110*b* side of the lightguide plate 110A is suppressed so that the light extraction efficiency can be improved.

The light-reflective member 140 may include the wall portion 140*w* in its part and, as a result, part of the upper surface 140*a* of the light-reflective member 140 which is opposite to the lower surface 110*b* of the lightguide plate 110A has the slope surface 140*s*. As seen from FIG. 2, typically, the slope surface 140*s* surrounds the light emitting element 120 along the four sides of the rectangular shape of the upper surface 110*a* of the lightguide plate 110A. The slope surface 140*s* may function as a reflection surface which is capable of reflecting incident light toward the upper surface 110*a* of the lightguide plate 110A. Therefore, the light-reflective member 140 that has the slope surface 140*s* is located on the lower surface 110*b* side of the lightguide plate 110A, whereby light traveling toward the lower surface 110*b* side of the lightguide plate 110A can be reflected by the slope surface 140*s* toward the upper surface 110*a*, so that light can be efficiently extracted from the upper surface 110*a*. Further, the slope surface 140*s* is provided in a peripheral portion of the lightguide plate 110A, so that the luminance in the peripheral portion of the lightguide plate 110A can be prevented from being relatively low as compared with the central portion.

The cross-sectional shape of the slope surface 140*s* may be curved such as shown in FIG. 2 or may be linear. The cross-sectional shape of the slope surface 140*s* is not limited to such examples but may include steps, bends, etc.

The height of the wall portion that surrounds the light emitting element 120 may vary among a plurality of light emitting modules 100 included in a single surface-emission light source 200 or may vary within a single light emitting module 100. For example, one of a plurality of slope surfaces 140*s* included in a single surface-emission light source 200 which is located at the outermost position in the lightguide plate 210 of the surface-emission light source 200 may have a greater height than the slope surfaces 140*s* located at the other portions of the lightguide plate 210.

The material of the light-reflective member 140 may be the same as the material of the above-described second light-reflective member 170. When the material of the light-reflective member 140 is the same as the material of the light-reflective member 170, a light-reflective member which covers an approximate entirety of the lower surface 110*b* of the lightguide plate 110A may be integrally formed of a light-reflective material. When the light-reflective member 140 is provided on the lower surface 110*b* side of the lightguide plate 110A, the effect of reinforcing the lightguide plate 110A may also be achieved.

Interconnect Layer 180

In the configuration illustrated in FIG. 3, the light emitting module 100A further includes an interconnect layer 180 located on the lower surface 140*b* of the light-reflective member 140. The interconnect layer 180 includes a wiring electrically coupled with the electrode 124 of the light emitting element 120. In this example, the interconnect layer 180 is depicted as being present on the light-reflective member 170, although the interconnect layer 180 can include a portion which is present on the lower surface 140*b* of the light-reflective member 140.

The interconnect layer 180 is typically a single-layer or multilayer film which is made of a metal such as Cu. The interconnect layer 180 is connected with an unshown power supply, or the like, and accordingly functions as a terminal for supplying a predetermined electric current to each light emitting element 120.

The interconnect layer 180 is provided on the lower surface 100*b* side of the light emitting module 100A, whereby for example a plurality of light emitting elements 120 included in the surface-emission light source 200 can be electrically coupled together via the interconnect layer 180. That is, the light emitting element 120 can be driven by the unit of the surface-emission light source 200, for example. As will be described later, a plurality of surface-emission light sources 200 can be combined together to form a larger surface-emission light source, and a local dimming operation of this surface-emission light source is possible. When the interconnect layer 180 is provided on the lower surface 100*b* side of the light emitting module 100A, wirings are provided on the surface-emission light source 200 side that includes a plurality of light emitting elements 120 and, therefore, connection with the power supply, or the like, is easy. That is, by connecting the power supply, or the like, surface emission is easily realized. As a matter of course, the light emitting element 120 may be driven by the unit of one or more light emitting modules 100A.

Figure 7:
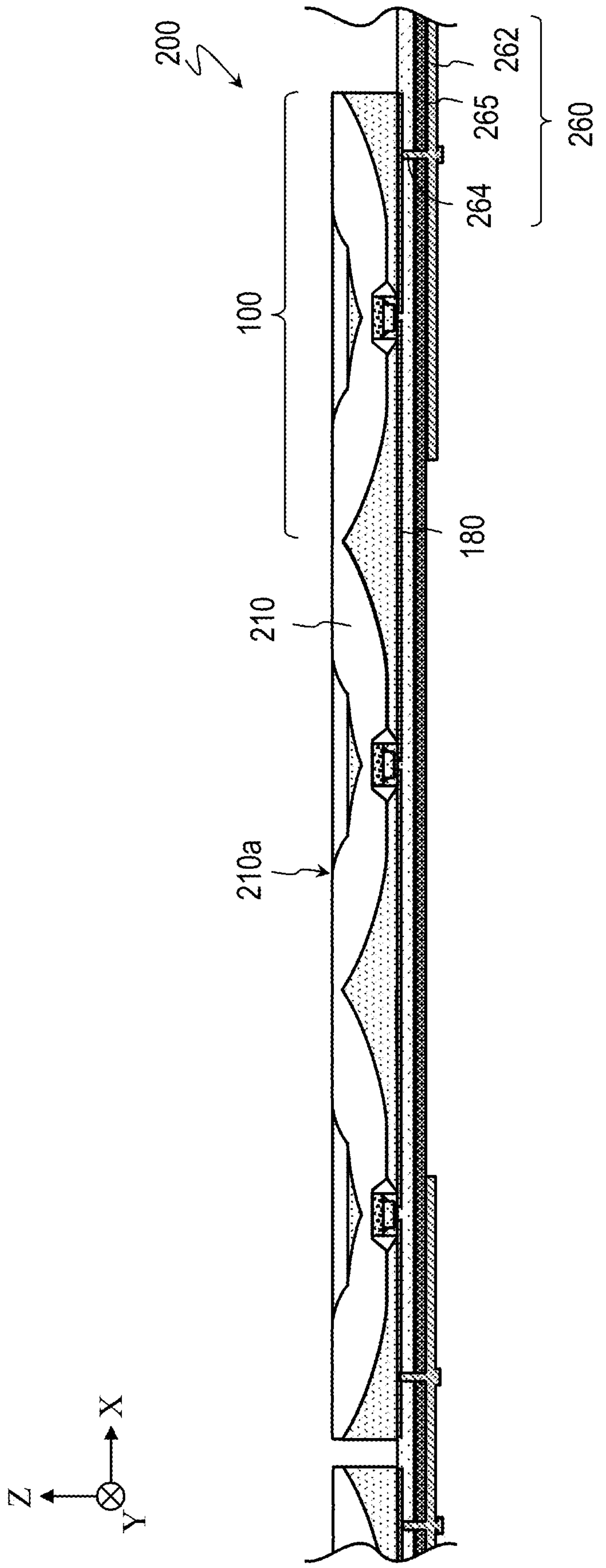
FIG. 7 is a schematic cross-sectional view showing a state where the surface-emission light source shown in FIG. 1 is connected with a wiring board.

FIG. 7 shows a state where the surface-emission light source 200 is connected with a wiring board. In one embodiment, a light-emitting device of the present disclosure can include a wiring board 260 as shown in FIG. 7. In the configuration illustrated in FIG. 7, the wiring board 260 includes an insulating substrate 265, an interconnect layer 262 provided on the insulating substrate 265, and a plurality of vias 264. The interconnect layer 262 is provided on one of the principal surfaces of the insulating substrate 265. The vias 264 have connection with the interconnect layer 262. The interconnect layer 262 is electrically coupled with the surface-emission light source 200 by the vias 264 provided inside the insulating substrate 265.

The wiring board 260 is located on the lower surface side of the surface-emission light source 200, i.e., on the side opposite to the upper surface 210*a* of the lightguide plate 210. The surface-emission light source 200 is mounted to the wiring board 260 by, for example, soldering the interconnect layer 180 to the vias 264 of the wiring board 260. According to the present embodiment, the interconnect layer 180 that has connection with each of the light emitting elements 120 can be provided on the surface-emission light source 200 side and, therefore, connections required for local dimming and the like can be easily formed without forming a complicated wiring pattern on the wiring board 260 side. The interconnect layer 180 can have a larger area than the lower surface of the electrode 124 of each light emitting element 120 and, therefore, formation of electrical connections with the interconnect layer 262 is relatively easy. Alternatively, for example, if the light emitting module 100A does not include the interconnect layer 180, the electrode 124 of the light emitting element 120 may be connected with the vias 264 of the wiring board 260.

Figure 8:
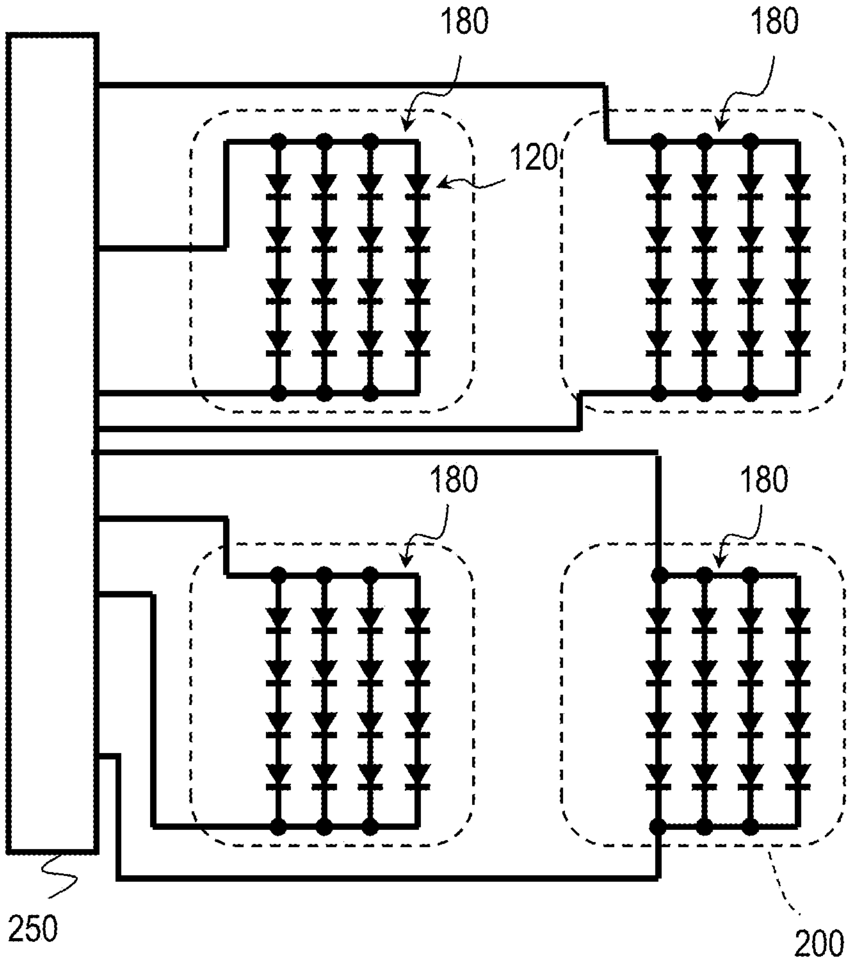
FIG. 8 is a diagram showing an example of a wiring pattern of an interconnect layer disposed on the surface-emission light source side.

FIG. 8 shows an example of the wiring pattern of the interconnect layer 180. For the sake of simplicity, FIG. 8 shows an example where four units of the surface-emission light source 200 shown in FIG. 1 are connected with a single driver 250.

Each surface-emission light source 200 can include the interconnect layer 180. In each surface-emission light source 200, the interconnect layer 180 electrically couples together a plurality of light emitting modules 100A included in the surface-emission light source 200. In the example shown in FIG. 8, the interconnect layer 180 included in each surface-emission light source 200 connects four light emitting elements 120 in series and connects four groups of the serially-connected light emitting elements 120 in parallel.

As shown in FIG. 8, each of these interconnect layers 180 can be connected with the driver 250 that drives the light emitting elements 120. The driver 250 may be provided on a substrate which supports an aggregate of the surface-emission light sources 200 (e.g., wiring board 260) and electrically coupled with the interconnect layer 180. Alternatively, the driver 250 may be provided on another substrate which is separate from the substrate that supports an aggregate of the surface-emission light sources 200 and electrically coupled with the interconnect layer 180. With such a circuit configuration, a local dimming operation by the unit of the surface-emission light source 200 which includes 16 light emitting elements 120 is possible. As a matter of course, connection of a plurality of light emitting elements 120 via the interconnect layer 180 is not limited to the example shown in FIG. 8. The light emitting elements 120 may be connected such that each of the light emitting modules 100A included in the surface-emission light source 200 can be independently driven. Alternatively, the light emitting modules 100A included in the surface-emission light source 200 may be separated into a plurality of groups, and a plurality of light emitting elements 120 may be electrically coupled such that the light emitting elements 120 are driven by the unit of a group including a plurality of light emitting modules 100A.

As described hereinabove, according to an embodiment of the present disclosure, light from the light emitting element 120 can be diffused throughout the plane of the lightguide plate 110A while excessive increase in luminance in a region immediately above the light emitting element 120 is suppressed by reflection at the reflective resin layer 130. Thereby, it can provide uniform light although it is small in thickness. Further as in the example described with reference to FIG. 3, the wavelength conversion member 150 is interposed between the light emitting element 120 and the lightguide plate 110A, so that color-mixed light can be diffused throughout the plane of the lightguide plate 110A before being emitted from the upper surface 110*a* of the lightguide plate 110A.

According to an embodiment of the present disclosure, for example, the thickness of the structure including the light-reflective member 140, in other words, the distance from the lower surface of the electrode 124 of the light emitting element 120 to the upper surface 110*a* of the lightguide plate 110A, may be reduced to, for example, 5 mm or smaller, 3 mm or smaller, or 1 mm or smaller. The distance from the lower surface of the electrode 124 of the light emitting element 120 to the upper surface 110*a* of the lightguide plate 110A can be not less than about 0.7 mm and not more than about 1.1 mm.

Figure 9:
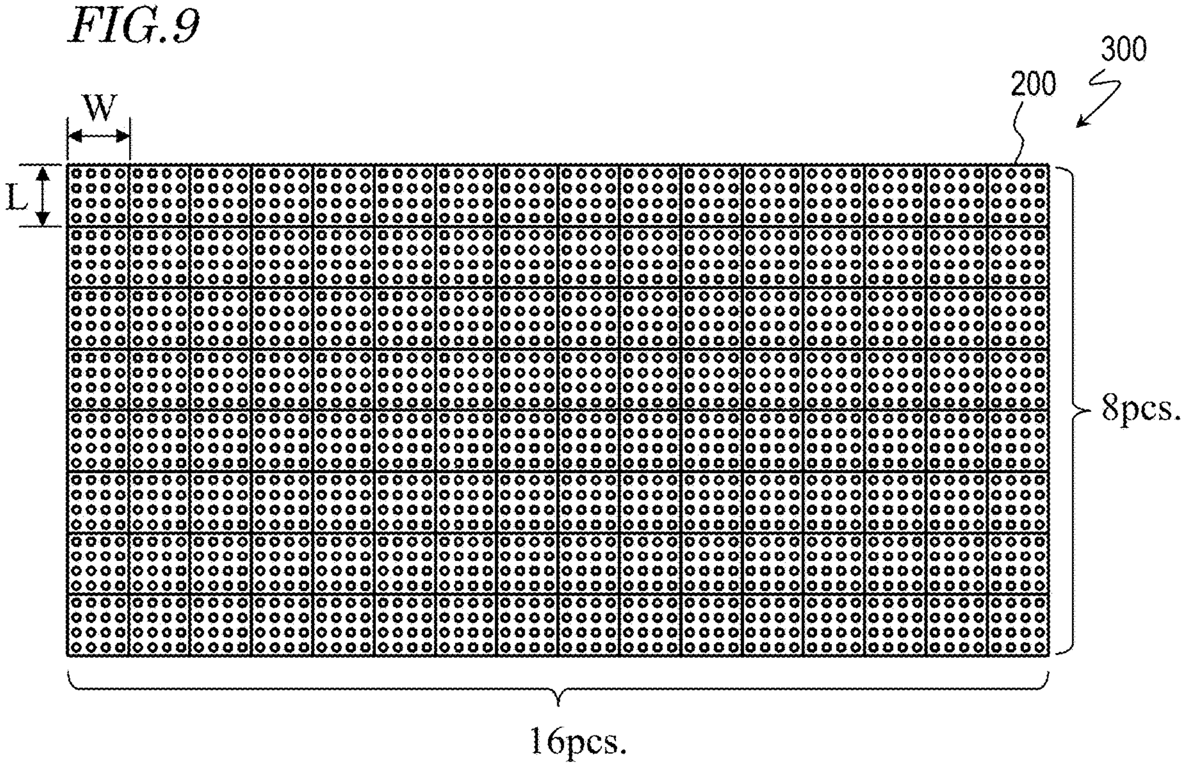
FIG. 9 is a schematic plan view showing an example where a plurality of units of the surface-emission light source shown in FIG. 1 are two-dimensionally arrayed.

FIG. 9 shows an example where a plurality of surface-emission light sources 200 are two-dimensionally arrayed. By two-dimensionally arraying a plurality of surface-emission light sources 200, a large-area light emitting surface can be realized.

A surface-emission light source 300 shown in FIG. 9 includes a plurality of sets of the surface-emission light source 200 shown in FIG. 1. In the example shown in FIG. 9, the surface-emission light sources 200 are arrayed in 8 rows and 16 columns. FIG. 9 schematically shows the two-dimensional array of the surface-emission light sources 200 as viewed from the upper surface 210*a* side of the lightguide plate 210.

The lightguide plates 210 of two surface-emission light sources 200 which are adjoining each other in the row or column direction are typically in direct contact with each other. However, it is not indispensable that a two-dimensional array is formed such that the lightguide plates 210 of two adjoining surface-emission light sources 200 are in direct contact with each other. A lightguide structure may be interposed between two adjoining lightguide plates 210 such that the lightguide structure optically couples together the two adjoining lightguide plates 210. Such a lightguide structure can be formed by, for example, applying a light-transmitting adhesive onto the lateral surface of the lightguide plate 210 and then curing the applied adhesive. Alternatively, the lightguide structure may be formed by two-dimensionally arraying a plurality of surface-emission light sources 200 with gaps therebetween, filling the gaps between two adjoining lightguide plates 210 with a light-transmitting resin material, and thereafter curing the resin material. The material of the lightguide structure provided between the lightguide plates 210 can be the same as the material of the previously-described bonding member 160. As the base material of the lightguide structure, using a material which has a refractive index equal to or higher than the material of the lightguide plate 210 is beneficial. The lightguide structure provided between the lightguide plates 210 may have a light diffusion function.

When the longitudinal length L and the transverse length W of each surface-emission light source 200 are, for example, about 24.3 mm and about 21.5 mm, respectively, the array of surface-emission light sources 200 shown in FIG. 9 is suitable for a 15.6-inch screen size with an aspect ratio of 16:9. For example, the surface-emission light source 300 shown in FIG. 9 can be suitably used for the backlight unit of a laptop computer having a 15.6-inch screen size.

In this example, an aggregate of the upper surfaces 210*a* of the lightguide plates 210, which is the upper surface of each surface-emission light source 200, forms a light emitting surface. Therefore, by changing the number of surface-emission light sources 200 included in the surface-emission light source 300 or by changing the arrangement of the surface-emission light sources 200, the surface-emission light source 300 can be readily applied to a plurality of types of liquid crystal panels of different screen sizes. That is, there is no need to redo the optical calculations for the lightguide plate 210 included in the surface-emission light source 200 or to remake a mold for formation of the lightguide plate 210, and it is possible to flexibly conform to changes in the screen size. Therefore, changing the screen size will not incur an increase in the manufacturing cost and the lead time.

Figure 10:
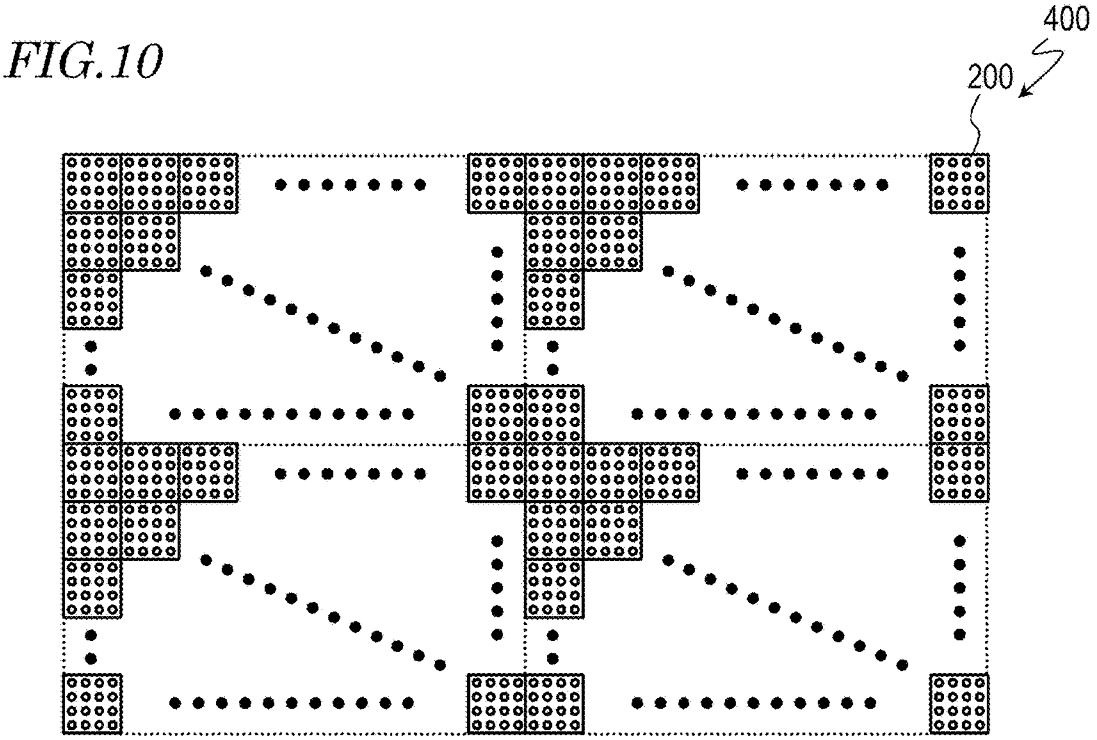
FIG. 10 is a schematic plan view showing a configuration where a plurality of sets of the surface-emission light sources shown in FIG. 9 are arrayed in two rows and two columns.

FIG. 10 shows a configuration where a plurality of sets of the surface-emission light sources 200 shown in FIG. 9 are arrayed in two rows and two columns. In this case, a total of 512 surface-emission light sources 200 together form a surface-emission light source 400 that is compatible with a 31.2-inch screen size with an aspect ratio of 16:9. For example, the array of the surface-emission light sources 200 shown in FIG. 10 can be used as the backlight unit of a liquid crystal television, etc. Thus, according to the present embodiment, it is relatively easy to obtain a large-area light emitting surface.

According to the method of forming a larger light emitting surface by a combination of a plurality of surface-emission light sources 200, it is possible to flexibly conform to liquid crystal panels of a variety of screen sizes without the necessity of re-designing the optical system or remaking a mold for formation of the lightguide plate in consideration of the screen size. That is, it is possible to produce a backlight unit that is compatible with a certain screen size at a low cost and within a short period of time. Another advantage is that even if there is a light emitting element that cannot be lit due to a breakage of wire, or the like, it is possible to simply replace a surface-emission light source that includes the inoperative light emitting element. Note that in a surface-emission light source which includes a two-dimensional array of a plurality of surface-emission light sources 200 such as illustrated in FIG. 9 and FIG. 10, one or more diffuser sheets and/or one or more prism sheets may be provided on the upper surface 210*a* side of the plurality of lightguide plates 210 so as to cover all of the upper surfaces 210*a*.

Figure 11:
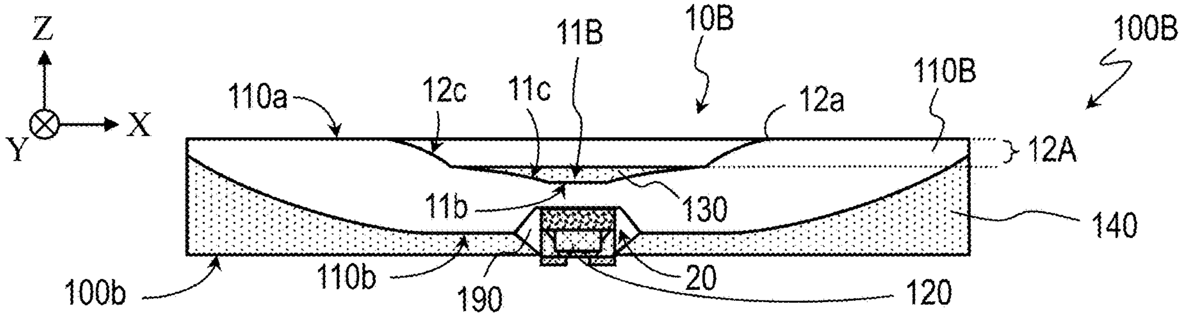
FIG. 11 is a schematic cross-sectional view showing a light emitting module of another embodiment of the present disclosure.

FIG. 11 shows a light emitting module of another embodiment of the present disclosure. The light emitting module 100B shown in FIG. 11 is different from the light emitting module 100A which has been described with reference to FIG. 2 in that the light emitting module 100B includes a lightguide plate 110B in place of the lightguide plate 110A.

In the configuration illustrated in FIG. 11, the upper surface 110*a* of the lightguide plate 110B has a first hole 10B which opposes the second hole 20 on the lower surface 110*b* side. The first hole 10B includes a first portion 11B which has a first lateral surface 11*c* and a second portion 12A which has a second lateral surface 12*c*. As shown in FIG. 11, the first portion 11B further has a bottom surface 11*b* connecting to the first lateral surface 11*c*. That is, in this example, the first portion 11B has the shape of an inverted truncated cone which is defined by the first lateral surface 11*c* and the bottom surface 11*b*. The diameter of the circular shape of the bottom surface 11*b* of the first portion 11B is, for example, about 0.3 mm.

Typically, the bottom surface 11*b* of the first portion 11B is a flat surface which is parallel to the upper surface 110*a* of the lightguide plate 110B. The shape of the first portion 11B of the first hole 10B is determined so as to include the bottom surface 11*b* and, therefore, the depth of the first hole 10B can be reduced while the reduction in volume of the reflective resin layer 130 is suppressed. That is, the light emitting module 100B can have a smaller thickness.

Figure 12:
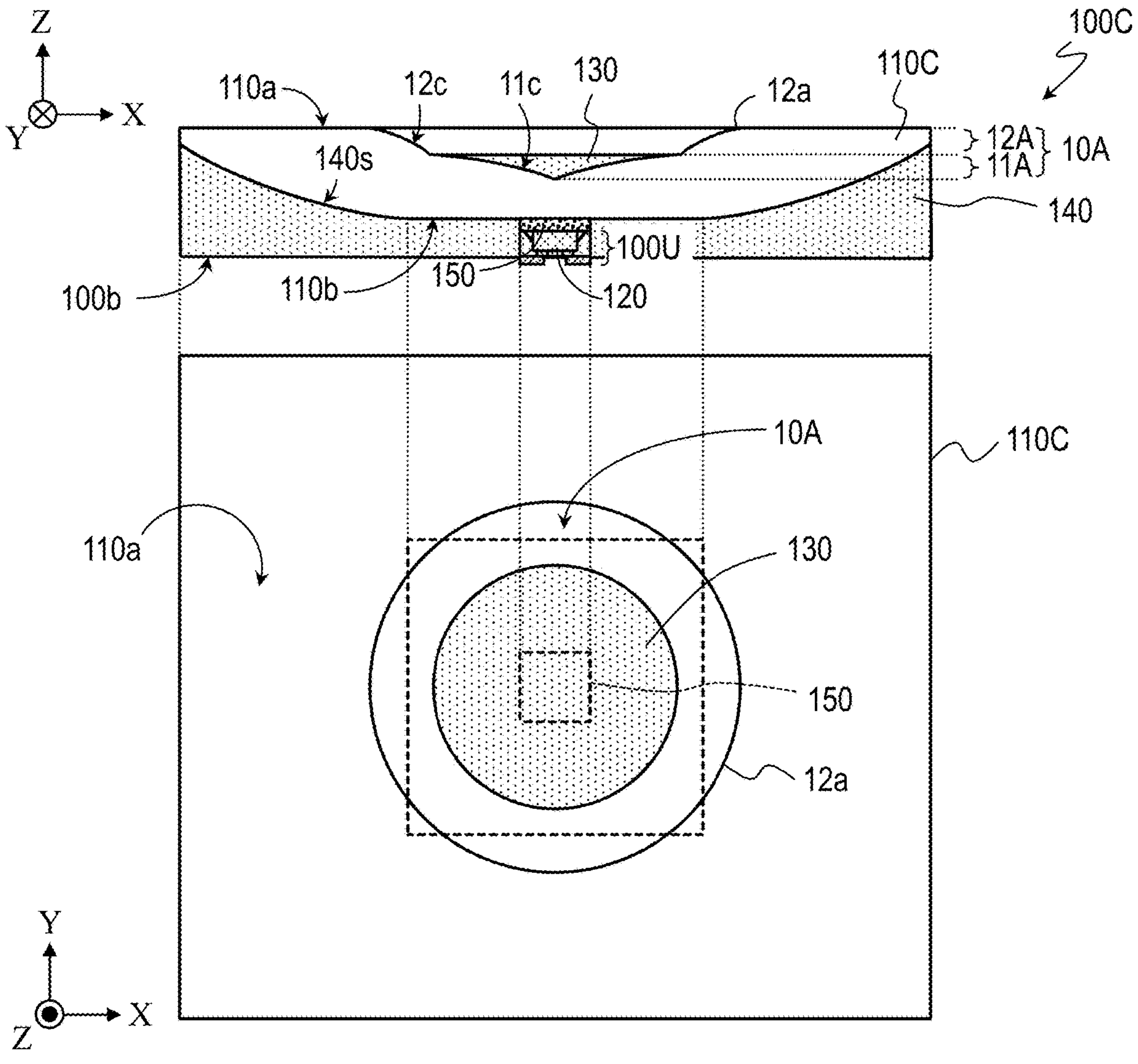
FIG. 12 is a diagram showing a light emitting module of still another embodiment of the present disclosure.

FIG. 12 shows a light emitting module of still another embodiment of the present disclosure. The light emitting module 100C shown in FIG. 12 includes a lightguide plate 110C. As shown in the drawing, the lightguide plate 110C is different from the previously-described lightguide plates 110A and 110B in that the second hole 20 is not provided on the lower surface 110*b* side of the lightguide plate 110C and that the light-reflective member 140 covers an approximate entirety of the lower surface 110*b* of the lightguide plate 110C. Note that, as does FIG. 2, FIG. 12 schematically shows together in a single drawing a cross section of the light emitting module 100C taken along a plane perpendicular to the upper surface 210*a* of the lightguide plate 210 in the vicinity of the center of the light emitting module 100C and an exemplary external appearance of the light emitting module 100C as viewed from the upper surface 210*a* side of the lightguide plate 210 in a direction perpendicular to the upper surface 210*a*.

In an embodiment of the present disclosure, formation of the second hole 20 in the lightguide plate is not indispensable. As illustrated in FIG. 12, the light emitter 100U may be bonded onto the lower surface side of the light emitting module 100C, i.e., herein, onto the lower surface 110*b* of the lightguide plate 110C. The light emitter 100U may be bonded to the lower surface 110*b* of the lightguide plate 110C using the above-described bonding member 190. Note that, instead of the light emitter 100U, the light emitting element 120 may be secured onto the lower surface 110*b* of the lightguide plate 110C via the wavelength conversion member 150.

In the configuration illustrated in FIG. 12, the wavelength conversion member 150 is interposed between the light emitting element 120 and the lightguide plate 110C. Herein, the wavelength conversion member 150 has a rectangular shape in a plan view. As shown in the lower part of FIG. 12, in a plan view, the wavelength conversion member 150 is located in a region more internal than the opening 12*a* that defines the periphery of the first hole 10A. In this example, one side of the rectangular shape of the wavelength conversion member 150 is parallel to one side of the rectangular shape of the lightguide plate 110C, although the wavelength conversion member 150 may be located on the lower surface 110*b* side of the lightguide plate 110C such that one side of the rectangular shape of the wavelength conversion member 150 is not parallel to one side of the rectangular shape of the lightguide plate 110C.

When the thicknesses of the wavelength conversion member 150 and the light-reflective member 140 are adjusted such that the entirety of the lateral surfaces of the wavelength conversion member 150 is covered with the light-reflective member 140, leakage of light from the lower surface 100*b* side of the light emitting module 100C can be suppressed and, therefore, this is advantageous from the viewpoint of the light extraction efficiency. As a matter of course, the first hole 10B that is shaped as shown in FIG. 11 may be employed in place of the first hole 10A of the lightguide plate 110C.

Figure 13:
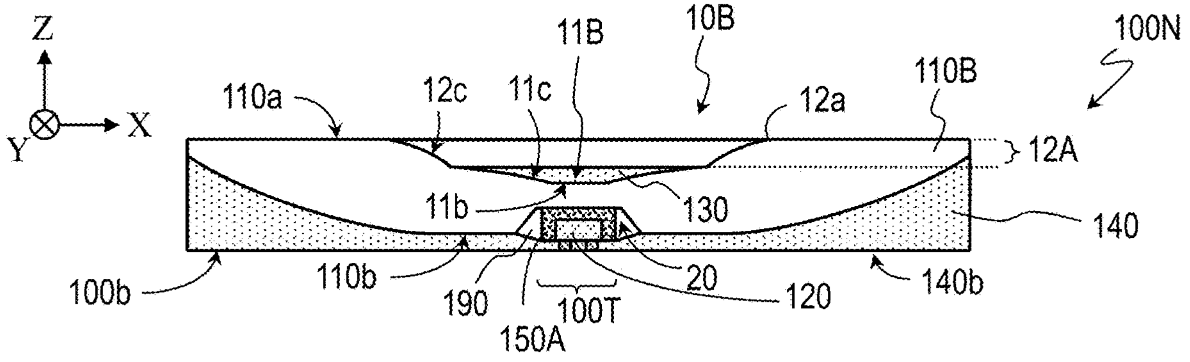
FIG. 13 is a diagram showing a light emitting module of still another embodiment of the present disclosure.

FIG. 13 schematically shows a cross section of a light emitting module of still another embodiment of the present disclosure. The light emitting module 100N shown in FIG. 13 includes a lightguide plate 110B and a light emitter 100T. The light emitter 100T includes a light emitting element 120 and a wavelength conversion member 150A. As schematically shown in FIG. 13, the light emitter 100T is provided at the bottom portion of the second hole 20 of the lightguide plate 110B via the bonding member 190.

In this example, the wavelength conversion member 150A covers not only the upper surface 120*a* of the light emitting element 120 but also the lateral surfaces of the main body 122. The shape of the wavelength conversion member is not limited to a plate-like shape but may be a shape which covers the lateral surface of the light emitting element 120. In this example, the light-reflective member 140 also covers parts of the wavelength conversion member 150A and the light emitting element 120 located on the side opposite to the upper surface 110*a* of the lightguide plate 110B. Note that, however, the lower surface of the electrode 124 of the light emitting element 120 is exposed out of the lower surface 140*b* of the light-reflective member 140 on the lower surface 100*b* side of the light emitting module 100N. Such a configuration can suppress leakage from the lower surface 140*b* of light traveling from the light emitting element 120 toward the lower surface 100*b* side of the light emitting module 100N.

Figure 14:
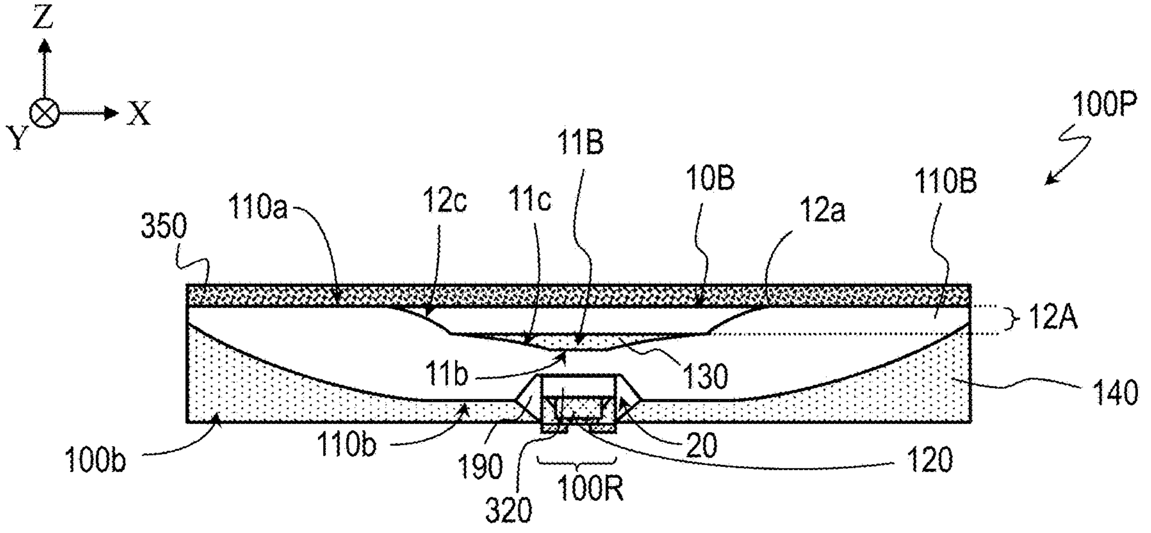
FIG. 14 is a schematic cross-sectional view showing a light emitting module of still another embodiment of the present disclosure.

FIG. 14 schematically shows a cross section of a light emitting module of still another embodiment of the present disclosure. The light emitting module 100P shown in FIG. 14 includes a lightguide plate 110B, a light emitter 100R and a wavelength conversion sheet 350. In the configuration illustrated in FIG. 14, the wavelength conversion sheet 350 is located on the upper surface 110*a* of the lightguide plate 110B. The wavelength conversion sheet 350 may be in contact with the upper surface 110*a* of the lightguide plate 110B or may be provided above the lightguide plate 110B so as to be spaced away from the upper surface 110*a* of the lightguide plate 110B. When optical sheets such as diffuser sheet and prism sheet are provided above the lightguide plate 110B, it is preferred that the diffuser sheet, the wavelength conversion sheet 350 and the prism sheet are provided above the lightguide plate 110B in increasing order of distance from the upper surface 110*a*. That is, it is preferred that the diffuser sheet is located between the upper surface 110*a* of the lightguide plate 110B and the wavelength conversion sheet 350, and the wavelength conversion sheet 350 is located between the diffuser sheet and the prism sheet.

The wavelength conversion sheet 350 is, typically, a resin sheet in which phosphor particles are dispersed. When such a wavelength conversion sheet 350 is used, the phosphor can be uniformly provided above the lightguide plate 110B. The same effect can be achieved also when the lightguide plate 110A is employed in place of the lightguide plate 110B. The phosphor can be a known material. Examples of the phosphor include fluoride-based phosphors such as KSF-based phosphors, nitride-based phosphors such as CASN, YAG-based phosphors, and β-SiAlON phosphors. The phosphor may be a quantum dot phosphor.

The light emitter 100R is different from the above-described light emitter 100U in that the light emitter 100R includes a plate-like light-transmitting member 320 instead of the wavelength conversion member 150. That is, the light emitter 100R includes a light emitting element 120, the light-transmitting member 320, a bonding member 160 and a light-reflective member 170.

The light-transmitting member 320 is made of a material which is capable of transmitting light. Examples of the material of the light-transmitting member 320 include silicone resins, modified silicone resins, epoxy resins, modified epoxy resins, urea resins, phenolic resins, acrylic resins, urethane resins, fluoric resins, and a resin containing two or more of these resins. A material which has a different refractive index from that of the base material may be dispersed in the material of the light-transmitting member 320 such that the light-transmitting member 320 can have a light diffusion function. For example, particles of titanium dioxide, silicon oxide, or the like, may be dispersed in the base material of the light-transmitting member 320.

Figure 15:
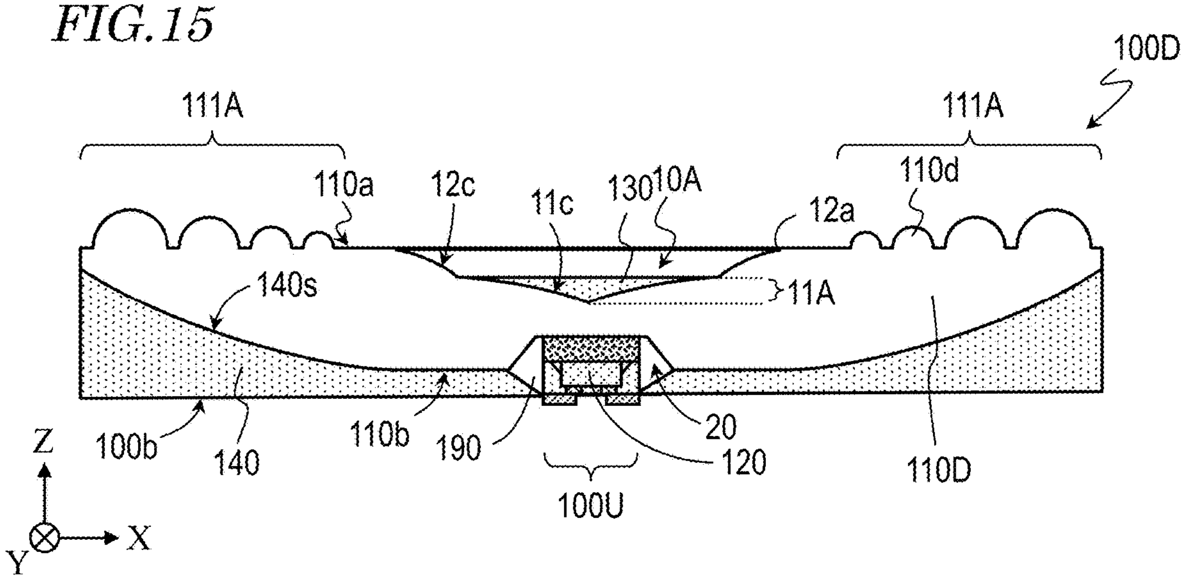
FIG. 15 is a schematic cross-sectional view showing a light emitting module of still another embodiment of the present disclosure.

FIG. 15 schematically shows a cross section of a light emitting module of still another embodiment of the present disclosure. The light emitting module 100D shown in FIG. 15 is also an example of the light emitting module 100 that is a constituent of the above-described surface-emission light source 200. As shown in the drawing, the light emitting module 100D includes a lightguide plate 110D, which has an upper surface 110*a* and a lower surface 110*b*, and a light emitting element 120 provided on the lower surface 110*b* side of the lightguide plate 110D.

The upper surface 110*a* of the lightguide plate 110D includes, at least in its part, a first region 111A in which a plurality of protrusions or recesses are provided. The first region 111A is located in a region of the upper surface 110*a* which does not overlap the first hole 10A. In the example shown in FIG. 15, a plurality of protrusions 110*d* are provided in the first region 111A.

When, for example, the plurality of protrusions 110*d* are provided in a region of the surface on the upper surface 110*a* side of the lightguide plate 110D which does not overlap the first hole 10A, light from the light emitting element 120 which is introduced into the lightguide plate 110D from the lower surface 110*b* side of the lightguide plate 110D can be efficiently extracted from the first region 111A. That is, the luminance in the first region 111A as viewed in the normal direction of the upper surface 110*a* of the lightguide plate 110D can be relatively improved.

Figure 16:
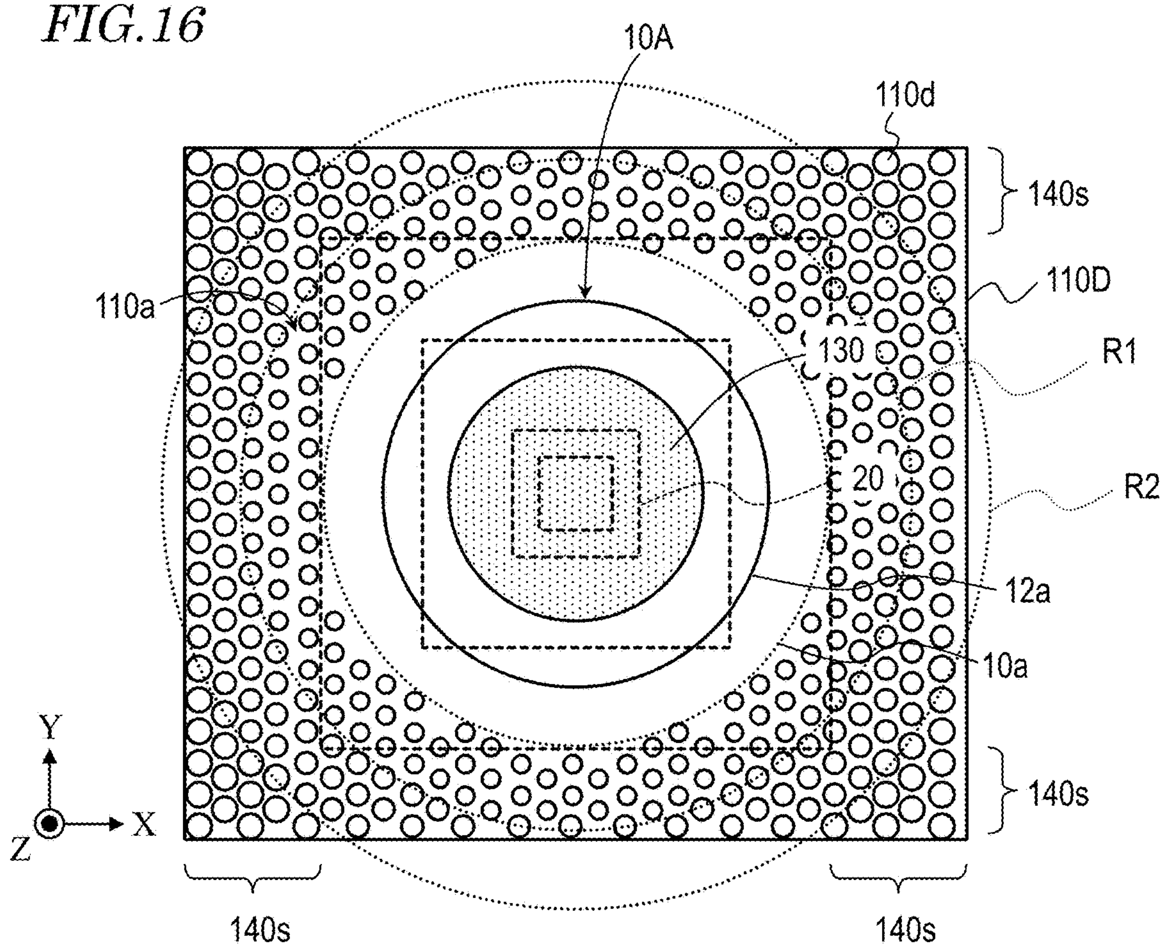
FIG. 16 is a schematic plan view showing an exemplary external appearance when the light emitting module shown in FIG. 15 is viewed in the normal direction of the upper surface of the lightguide plate.

FIG. 16 schematically shows an exemplary external appearance when the light emitting module 100D shown in FIG. 15 is viewed in the normal direction of the upper surface 110*a* of the lightguide plate 110D. In this example, the first region 111A occupies the entirety of a region of the upper surface 110*a* which does not overlap the first hole 10A, and the plurality of protrusions 110*d* are provided in the form of a plurality of dots in the first region 111A. Note that FIG. 15 and FIG. 16 are merely schematic diagrams for illustrating the configuration of the upper surface 110*a* of the lightguide plate 110D, and the number or shape of the plurality of protrusions 110*d* or other components may not be strictly identical between the cross-sectional view and the plan view. The same applies to the other drawings of the present disclosure.

As schematically shown in FIG. 16, the proportion of the protrusions 110*d* per unit area in the first region 111A increases concentrically in an outward direction from the light emitting element 120. In this example, each of the plurality of protrusions 110*d* has a circular external shape in a plan view, and the diameter of the circular shape of the protrusions 110*d* increases as the distance from the center of the lightguide plate 110D increases. More specifically, protrusions 110*d* located in a region between an imaginary circle R1 and an imaginary circle R2 around the position of the light emitting element 120, which are represented by dotted lines in FIG. 16 (the circle R2 is greater than the circle R1), have a greater diameter than protrusions 110*d* located in a region between the circle R1 and the opening 10*a* of the first hole 10A. Further, some of the plurality of protrusions 110*d* which are located outside the circle R2 have a greater diameter than the protrusions 110*d* located in a region between the circle R1 and the circle R2. As understood from the configuration shown in FIG. 16, it is not indispensable that the diameter of the plurality of protrusions 110*d* evenly increases as the distance from the light emitting element 120 increases.

According to the configuration such as illustrated in FIG. 16 where the proportion of the plurality of protrusions 110*d* per unit area in the first region 111A increases concentrically in an outward direction from the light emitting element 120, the light emitted from a position away from the light emitting element 120 can be relatively increased. In this example, a plurality of protrusions 110*d* provided near the four corners of the upper surface 110*a* of the lightguide plate 110D have the largest diameter among the protrusions 110*d* provided in the first region 111A. Therefore, as compared with the other regions of the first region 111A, the luminance near the four corners of the upper surface 110*a* of the lightguide plate 110D can be relatively increased. Since the luminance in a region which is likely to be relatively dark is improved, the luminance unevenness can be suppressed more effectively while increase in thickness of the lightguide plate 110D is suppressed.

In the configuration illustrated in FIG. 16, each of the plurality of protrusions 110*d* is a circular dot. The diameter of the circular shape is in the range of, for example, not less than 1 μm and not more than 500 μm. As a matter of course, the planar shape of each protrusion 110*d* is not limited to a perfect circle. The planar shape of each of the plurality of protrusions 110*d* may be an elliptical shape, a deformed circular shape, a polygonal shape, or an indeterminate shape. In this specification, the planar shape of the protrusion or recess refers to the shape of the periphery of a protrusion or recess projected onto a plane parallel to the upper surface of the lightguide plate. When the planar shape of a protrusion (or recess) is not circular, the diameter of an imaginary circle which includes the periphery of the protrusion (or the opening of the recess) is in the aforementioned range, for example.

When the protrusions 110*d* are shaped so as to protrude above the upper surface 110*a* of the lightguide plate 110D, total reflection inside the lightguide plate 110D is suppressed so that the effect of increasing the light extracted from the upper surface 110*a* can be achieved. Thus, the protrusions 110*d* may have various shapes including hemispherical, conical, pyramidal, and truncated pyramidal shapes.

In the example shown in FIG. 16, the plurality of protrusions 110*d* are two-dimensionally arranged in the first region 111A such that the centers of the protrusions 110*d* are located on the lattice points of a triangular lattice. As a matter of course, the arrangement of the plurality of protrusions 110*d* is not limited to this example, and an arbitrary arrangement can be employed according to desired optical characteristics. For example, the plurality of protrusions 110*d* may be two-dimensionally arranged in the first region 111A such that the centers of the protrusions 110*d* are located on the lattice points of a square lattice.

Figure 17:
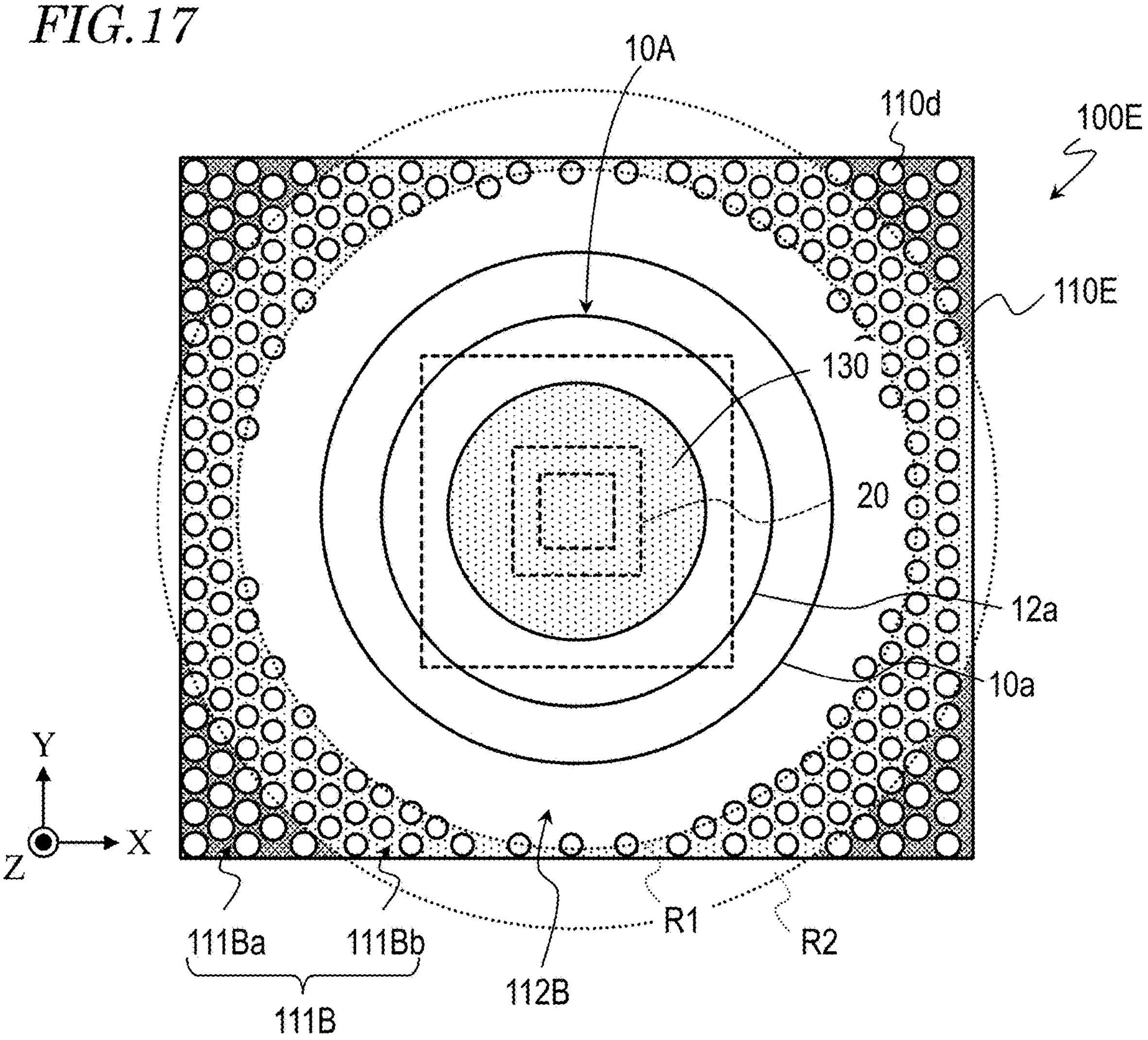
FIG. 17 is a schematic plan view showing another example of a lightguide plate which has a plurality of protrusions at its upper surface.

FIG. 17 shows another example of a lightguide plate which has a plurality of protrusions at the upper surface. The light emitting module 100E shown in FIG. 17 includes a lightguide plate 110E. The lightguide plate 110E has, at its upper surface 110*a*, a first region 111B and a second region 112B located more internal than the first region 111B. The second region 112B is an annular region of the upper surface 110*a* of the lightguide plate 110E surrounding the first hole 10A. The first region 111B is a region outside the second region 112B and surrounds the second region 112B.

In the example shown in FIG. 17, the first region 111B is a part of the upper surface 110*a* which is outside the imaginary circle R1, and a plurality of protrusions 110*d* are provided at its surface. Likewise as in the example which has been described with reference to FIG. 16, the diameter of the circular shape of protrusions 110*d* located in part of the first region 111B outside the above-described imaginary circle R2 is greater than the diameter of the circular shape of protrusions 110*d* located in another part of the first region 111B inside the imaginary circle R2. Part of the first region 111B outside the imaginary circle R2 may be referred to as “outer region”, and another part of the first region 111B which is closer to the light emitting element 120 than the outer region, in other words, a region between the imaginary circles R1 and R2, may be referred to as “inner region”. In FIG. 17, the inner region 111Bb is represented as the shaded area, and the outer region 111Ba is represented as the darker-shaded area, for ease of understanding.

Meanwhile, the second region 112B is another part of the upper surface 110*a* lying between the imaginary circle R1 and the opening 10*a* of the first hole 10A, and no protrusions 110*d* are provided at its surface. Therefore, in this example, the surface of the second region 112B is a flat surface. As illustrated in FIG. 17, the plurality of protrusions 110*d* do not need to be provided across the entirety of the first region 111B but may be provided in at least part of the first region 111B. When for example a plurality of protrusions 110*d* are provided in a region of the lightguide plate 110E which is relatively distant from the light emitting element 120, light extracted from the region which is relatively distant from the light emitting element 120, i.e., light extracted from the first region 111B, increases as compared with the second region 112B. As a result, the luminance of the first region 111B that is more distant from the light emitting element 120 increases, and occurrence of luminance unevenness can be more effectively reduced.

Thus, in the examples shown in FIG. 15 to FIG. 17, in the upper surface 110*a* of the lightguide plate, the proportion of the plurality of protrusions 110*d* per unit area increases concentrically in an outward direction from the light emitting element 120. Herein, the term “concentrically” used in this specification means having a common center but does not intend to mean that the shape of a plurality of figures which have a common center is limited to a perfect circle. The above-described imaginary circle R1 and/or circle R2 are not limited to perfect circles but can be ellipses or the like. For example, the upper surface 110*a* of the lightguide plate 110E is rectangular, the imaginary circle R1 and the imaginary circle R2 may be elliptical. In this case, the centers of these ellipses refer to the intersection of the major axis and the minor axis.

As previously described, the protrusions 110*d* can achieve the effect of increasing light extracted from the upper surface 110*a* so long as the protrusions 110*d* are shaped so as to protrude above the upper surface 110*a* of the lightguide plate. Therefore, such a configuration can be employed that the proportion of the plurality of protrusions 110*d* per unit area is constant in the first region.

Figure 18:
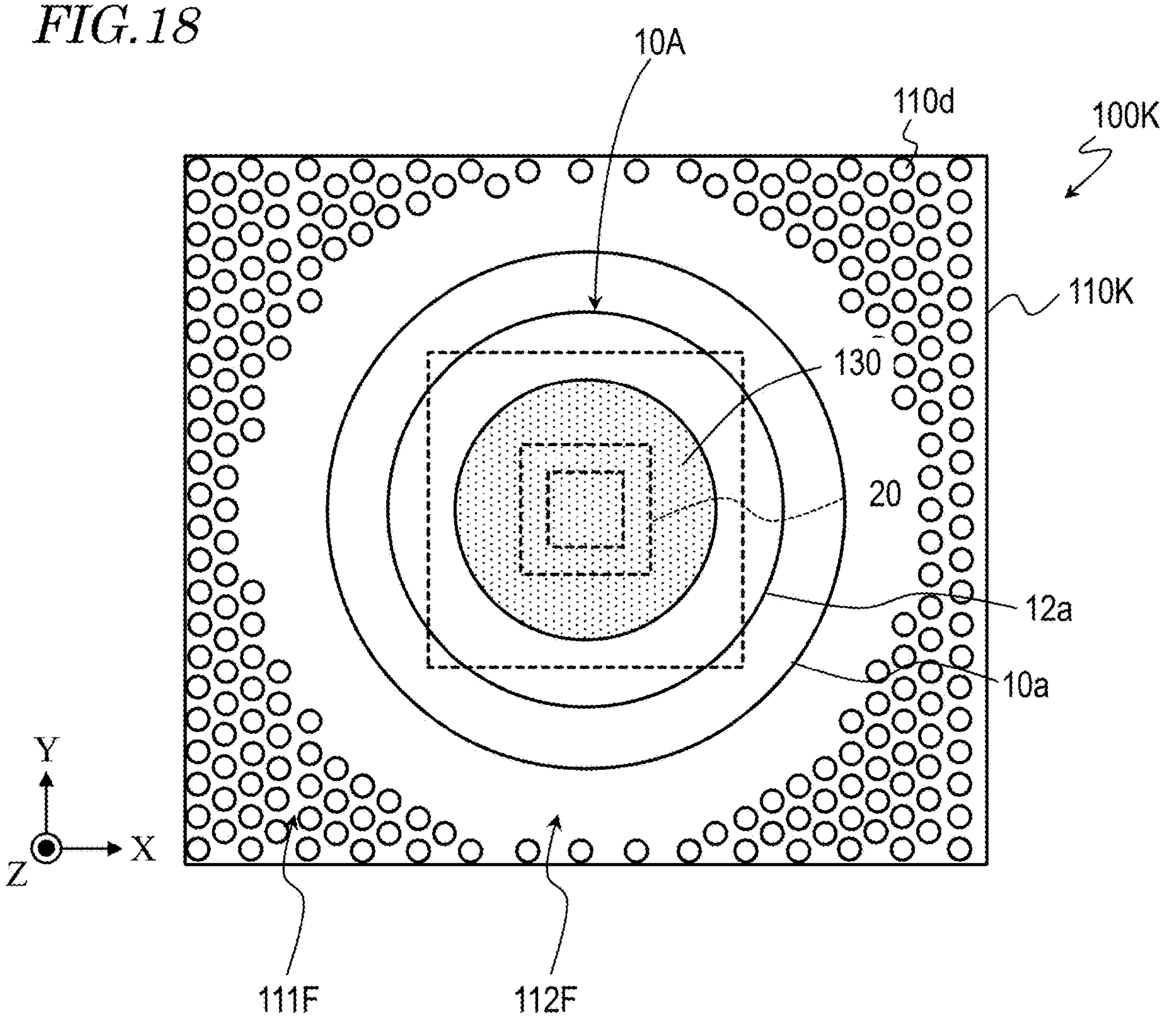
FIG. 18 is a schematic plan view showing still another example of a lightguide plate which has a plurality of protrusions at its upper surface.

FIG. 18 shows still another example of a lightguide plate which has a plurality of protrusions at the upper surface. The light emitting module 100K shown in FIG. 18 includes a lightguide plate 110K. The lightguide plate 110K has, at its upper surface 110*a*, a first region 111F and a second region 112F located more internal than the first region 111F. In this example, a plurality of protrusions 110*d* are selectively provided in the first region 111F at a constant pitch so as to have a constant size. If the proportion of the plurality of protrusions 110*d* per unit area is constant, such a configuration is possible that either or both of the size and the arrangement pitch of the plurality of protrusions 110*d* are not constant. According to the configuration illustrated in FIG. 18, within the upper surface 110*a* of the lightguide plate, the luminance of the first region 111F in which the plurality of protrusions 110*d* are provided can be relatively improved. The second region 112F may be omitted such that the plurality of protrusions 110*d* are provided across the entirety of the upper surface 110*a*.

The shape of the protrusions provided in the first region is not limited to these examples. For example, the protrusions may be in the form of an annular convex ring. In this case, for example, by increasing the width of a plurality of convex rings as the distance from the light emitting element 120 increases, the proportion of the plurality of protrusions per unit area as viewed in plan can be increased concentrically in an outward direction from the light emitting element 120. Therefore, likewise as in a case where a plurality of protrusions in the form of dots are provided in the first region, the luminance at a position in the first region which is distant from the light emitting element 120 can be improved, and the effect of suppressing luminance unevenness can be achieved.

A plurality of protrusions each having an annular shape and a plurality of protrusions each having the shape of a dot may be provided together at the upper surface 110*a*. When the protrusions in the shape of dots are provided in addition to the annular protrusions, it is possible to suppress occurrence of an annular brightness/darkness pattern as compared with a case only the annular protrusions are provided.

Alternatively, a plurality of recesses may be provided in place of the plurality of protrusions. In this case, the plurality of recesses have such shapes that, for example, the opening of the recesses increases as the distance from the light emitting element 120 increases.

The plurality of recesses can be, for example, a plurality of dots. Herein, the term "dot" used in this specification generally refers to a figure which is round in a plan view, such as circle and ellipse. The term "dot" used in this specification is interpreted as including both a feature protruding above the upper surface 110*a* of the lightguide plate and a feature recessed below the upper surface 110*a*. Alternatively, the plurality of recesses may have the shape of an annular groove in the first region of the upper surface 110*a*. By increasing the width of the ring-shaped groove as the distance from the light emitting element 120 increases, the proportion of the plurality of recesses per unit area as viewed in plan may be increased concentrically in an outward direction from the light emitting element 120. Alternatively, the interval of the plurality of recesses each having an annular shape may be gradually decreased.

Alternatively, a plurality of protrusions and a plurality of recesses may be provided together in the first region. The first region of the upper surface 110*a* of the lightguide plate can have a combination of two or more types of features selected from a plurality of protrusions each having the shape of a dot, a plurality of recesses each having the shape of a dot, a plurality of protrusions each having an annular shape, and a plurality of recesses each having an annular shape.

Examples

A plurality of samples of which the first holes had different configurations were produced and examined the distribution of the luminance achieved when a light emitting element was lit up. A two-stage slope was provided in the lateral surface of the first hole, and the reflective resin layer 130 was selectively formed inside the first portion which was a part of the first hole closer to the lower surface of the lightguide plate. The effect of suppressing luminance unevenness which was achieved by this configuration was investigated.

Example

As a sample of Example, a surface-emission light source was produced which included an array of light emitting modules in 4 rows and 4 columns, each having the same configuration as the light emitting module 100B shown in FIG. 11. Herein, the entirety of the first portion 11B of the first hole 10B was filled with a silicone resin containing titanium oxide particles.

Comparative Example

As a sample of Comparative Example, a surface-emission light source was produced of which the shape of the first hole of each light emitting module was conical such that the lateral surface had a monotonous slope, and the entirety of the first hole was filled with a silicone resin containing titanium oxide particles.

Figure 19:
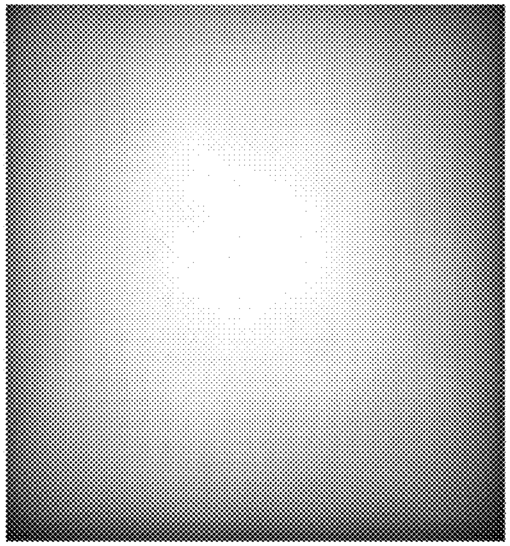
FIG. 19 is a diagram showing the external appearance of a sample of Example where a diffuser sheet and the first and second prism sheets were placed on the upper surface side of the lightguide plate, which was viewed from the upper surface side of the lightguide plate with the light emitting elements being lit up.
Figure 20:
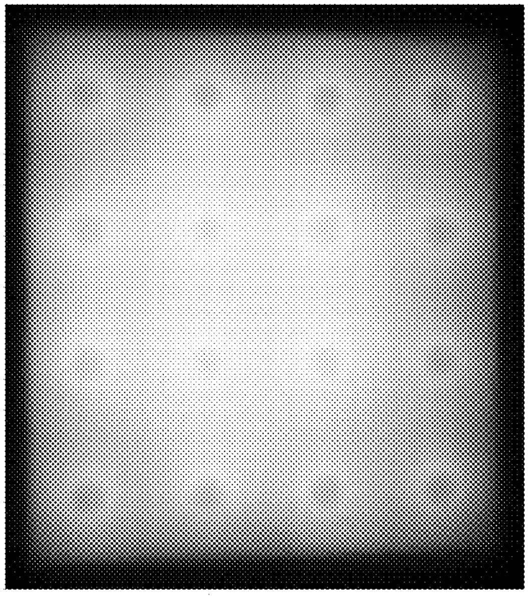
FIG. 20 is a diagram showing the external appearance of a sample of Comparative Example where a diffuser sheet and the first and second prism sheets were placed on the upper surface side of the lightguide plate, which was viewed from the upper surface side of the lightguide plate with the light emitting elements being lit up.

FIG. 19 shows the external appearance of the sample of Example as viewed from the upper surface side of the lightguide plate. In FIG. 19, the external appearance is shown in a circumstance where the light emitting elements were lit up with a diffuser sheet and first and second prism sheets were being placed on the upper surface side of the lightguide plate. FIG. 20 shows the external appearance of the sample of Comparative Example as viewed from the upper surface side of the lightguide plate as does FIG. 19. In FIG. 20, the external appearance is shown in a circumstance where the light emitting elements were lit up with a diffuser sheet and first and second prism sheets were being placed on the upper surface side of the lightguide plate. Herein, the first prism sheet and the second prism sheet were provided on the upper surface side of the lightguide plate such that the knife edges of the prisms of the first prism sheet perpendicularly intersected the knife edges of the prisms of the second prism sheet.

As seen from the comparison between FIG. 19 and FIG. 20, in the sample of Example, the luminance unevenness as viewed from the upper surface side of the lightguide plate is more suppressed. We evaluated the uniformity in luminance through the following procedure. From 16 light emitting modules arrayed in 4 rows and 4 columns, the part of 2 rows and 2 columns at the center was taken out and divided into a plurality of regions with a mesh of an arbitrary size. In each of the regions, the luminance was measured. The maximum and the minimum were extracted from luminance values measured in respective regions, and values resulting from the calculation of the following formula, which are referred to as "luminance uniformity (%)" of the samples, were compared.

((minimum luminance)/(maximum luminance))*100
("*" means multiplication)

The luminance uniformity of the sample of Comparative Example was 78%. The luminance uniformity of the sample of Example was 92%. That is, in the sample of Example, the difference between the maximum luminance and the minimum luminance in the part of 2 rows and 2 columns at the center was smaller. Thus, it was ascertained that, by shaping the lateral surface of the first hole so as to have a two-stage slope and selectively forming a light-reflective resin layer in the first portion, the luminance unevenness across the upper surface of the lightguide plate can be more effectively suppressed as compared with a case where a light-reflective resin layer is formed over the entirety of the conical first hole.

The embodiments of the present disclosure are useful in various types of light sources for lighting, on-vehicle light sources, display light sources, etc. Particularly, the embodiments of the present disclosure are advantageously applicable to backlight units for liquid crystal display devices. The light emitting module or surface-emission light source according to the embodiments of the present disclosure may suitably be used in backlights for display devices of mobile devices, for which there are strong demands for reducing the thickness, surface-emitting devices that are capable of local dimming, etc.

While certain embodiments of the present invention have been described, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A light emitting module comprising:

a lightguide plate having an upper surface and a lower surface that is opposite to the upper surface, the upper surface including a first hole;

a light emitting element on a lower surface side of the lightguide plate, the light emitting element facing the first hole; and a reflective resin layer, wherein the first hole includes a first portion and a second portion, the first portion includes a first lateral surface sloping with respect to the upper surface, the second portion has a second lateral surface sloping with respect to the upper surface, the second lateral surface being present between an opening in the upper surface and the first lateral surface of the first portion, and the reflective resin layer is located in the first portion of the first hole, and wherein an inclination of the first lateral surface with respect to the upper surface is smaller than an inclination of the second lateral surface with respect to the upper surface.

2. The light emitting module of claim 1, wherein a refractive index inside the second portion of the first hole is lower than a refractive index of the reflective resin layer.

3. The light emitting module of claim 2, wherein the first portion of the first hole further has a bottom surface connecting to the first lateral surface.

4. The light emitting module of claim 3, wherein a shape of the second lateral surface in a cross section perpendicular to the upper surface is a curved shape.

5. The light emitting module of claim 2, wherein a shape of the second lateral surface in a cross section perpendicular to the upper surface is a curved shape.

6. The light emitting module of claim 1, wherein the first portion of the first hole further has a bottom surface connecting to the first lateral surface.

7. The light emitting module of claim 6, wherein a shape of the second lateral surface in a cross section perpendicular to the upper surface is a curved shape.

8. The light emitting module of claim 1, wherein a shape of the second lateral surface in a cross section perpendicular to the upper surface is a curved shape.

9. The light emitting module of claim 1, wherein the lower surface of the lightguide plate has a second hole at a position opposite to the first hole, and the light emitting element is located inside the second hole in a plan view.

10. The light emitting module of claim 9, further comprising a wavelength conversion member located inside the second hole between the light emitting element and the lightguide plate.

11. The light emitting module of claim 1, wherein the light emitting element is located inside the first hole in a plan view, and the light emitting module further includes a wavelength conversion member located between the light emitting element and the lightguide plate.

12. The light emitting module of claim 1, further comprising a wavelength conversion sheet located on or above the upper surface of the lightguide plate.

13. The light emitting module of claim 1, wherein the light emitting module further includes a light-reflective member which covers at least part of the lower surface of the lightguide plate.

14. The light emitting module of claim 13, wherein the light emitting element includes an electrode on a side opposite to the lightguide plate, and the light emitting module further comprises an interconnect layer located on a lower surface side of the light-reflective member, the interconnect layer being electrically coupled with the electrode.

15. The light emitting module of claim 13, wherein the light-reflective member includes a wall portion rising from the lower surface side of the lightguide plate toward an upper surface side of the lightguide plate, the wall portion having a slope surface which surrounds the light emitting element.

16. A surface-emission light source comprising a plurality of the light emitting modules of claim 1, wherein the plurality of the light emitting modules are two-dimensionally arrayed.

17. The light emitting module of claim 1, wherein the first lateral surface is a curve that is convex toward the inside of the first hole.

18. The light emitting module of claim 1, wherein the second lateral surface is a curve that is convex toward the inside of the first hole.

* * * * *